(12) United States Patent  
Okabe

(10) Patent No.: US 8,646,150 B2  
(45) Date of Patent: Feb. 11, 2014

(54) HANDLE LOCK STRUCTURE FOR WORKING MACHINE

(75) Inventor: Kaku Okabe, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 350 days.

(21) Appl. No.: 12/859,958

(22) Filed: Aug. 20, 2010

(65) Prior Publication Data

US 2011/0056255 A1 Mar. 10, 2011

(30) Foreign Application Priority Data

Sep. 4, 2009 (JP) ................................ 2009-204772

(51) Int. Cl.  
*A45C 13/26* (2006.01)

(52) U.S. Cl.  
USPC .............................. 16/110.1; 16/113.1; 16/438

(58) Field of Classification Search  
USPC ............... 16/110.1, 112.1, 113.1, 114.1, 405, 16/408, 409, 410, 411, 427, 429, 436, 437, 16/438, 444, 445, 446  
See application file for complete search history.

(56) References Cited

U.S. PATENT DOCUMENTS

| | | | | |
|---|---|---|---|---|
| 5,421,605 A | * | 6/1995 | Chen ............................. | 280/655 |
| 5,647,096 A | * | 7/1997 | Chang .......................... | 16/113.1 |
| 5,816,374 A | * | 10/1998 | Hsien ............................ | 16/405 |
| 5,819,892 A | * | 10/1998 | Deliman et al. ............... | 16/429 |
| 2006/0032718 A1 | * | 2/2006 | Liang ........................... | 16/113.1 |

FOREIGN PATENT DOCUMENTS

| | | |
|---|---|---|
| DE | 20 2005 019 979 U1 | 4/2006 |
| JP | 61-59590 A | 3/1986 |
| JP | 64-44871 U | 3/1989 |
| JP | 3027609 U | 8/1996 |
| JP | 111321658 * | 11/1999 |
| JP | 2003-521262 A | 7/2003 |
| JP | 2005-313796 A | 11/2005 |
| JP | 2008-024278 A | 2/2008 |
| JP | 4226404 B2 | 2/2009 |

OTHER PUBLICATIONS

European Search Report dated Nov. 5, 2010, issued in corresponding European Patent Application No. 10173061.2.  
Japanese Office Action dated Dec. 18, 2012, issued in corresponding Japanese patent application No. 2009-204772, w/ English translation.

* cited by examiner

*Primary Examiner* — Jeffrey O Brien  
(74) *Attorney, Agent, or Firm* — Westerman, Hattori, Daniels & Adrian, LLP

(57) ABSTRACT

Handle lock structure includes: left and right lock members provided on a body of a working machine for movement into engagement with engaging portions of left and right handle sections of a handle as the handle is pivotally moved in a deploying direction from a stored position toward a deployed position, thereby locking the handle sections in the deployed position; and a lock cancellation lever for moving the left and right lock members out of the engagement with the engaging portions to compulsorily cancel the locking, by the left and right lock members, of the left and right handle sections in the deployed position.

7 Claims, 18 Drawing Sheets

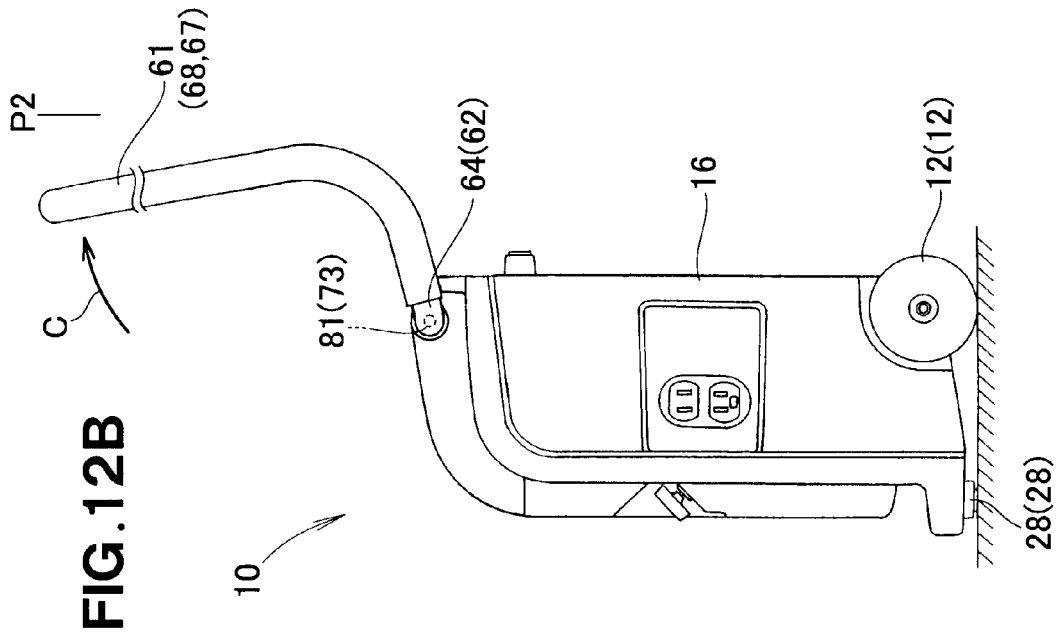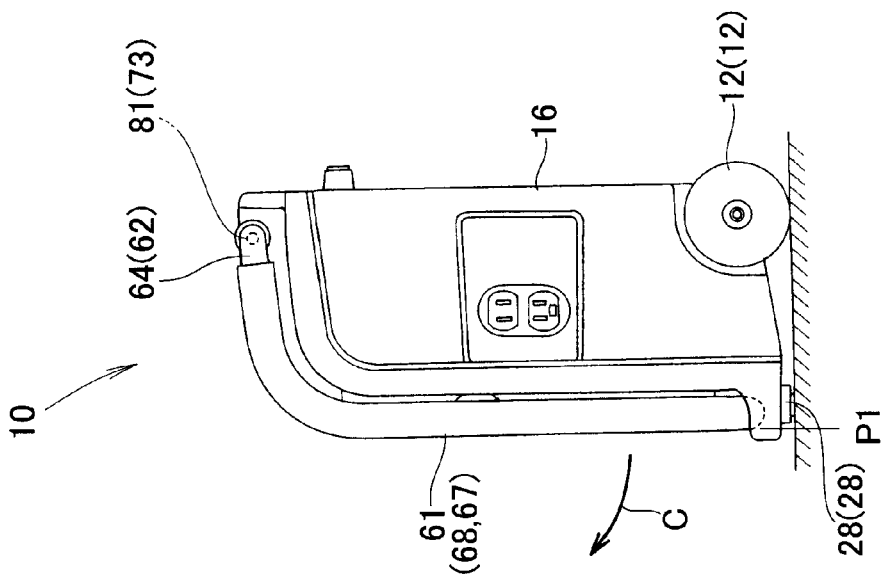

HANDLE LOCK STRUCTURE FOR WORKING MACHINE

FIELD OF THE INVENTION

The present invention relates to a handle lock structure for working machines in which a handle pivotally mounted on the body of a working machine is movable between a stored position where the handle is stored in the machine body and a deployed position where the handle is deployed from the machine body, and in which the machine body is towable by a user or human operator using the handle retained in the deployed position.

BACKGROUND OF THE INVENTION

Among the conventionally-known working machines are ones in which towing wheels are mounted on a bottom section of the body of the working machine (i.e., working machine body) and a pair of handle bars, constituting a towing handle, are pivotably mounted on a top section of the working machine body, an example of which is disclosed in Japanese Patent No. 4226404 (hereinafter referred to as "patent literature"). The pair of handle bars is pivotable between stored position where the handle is stored in the machine body and a deployed position where the handle is deployed from the machine body. The machine body is towable by a user or human operator pulling the handle bars retained in the deployed position. Namely, the working machine disclosed in the patent literature has portability such that it can be moved by being towed by a user or human operator using the handle.

The working machine disclosed in the patent literature also includes a handle lock structure for locking the pair of handle bars in the deployed position, and the handle lock structure includes a pair of lock cancellation levers provided on respective ones of the handle bars. By operating the individual lock cancellation levers, the human operator can cancel a locked state of the pair of handle bars and thereby retract the pair of handle bars from the deployed position to the stored position.

However, when the pair of handle bars (towing handle) is to be retracted from the deployed position to the stored position, the handle lock structure shown in the patent literature, there is a need for the human operator to first operate the pair of lock cancellation levers and then move the pair of handle bars to the stored position. Thus, operation for retracting the pair of handle bars to the stored position would require extra labor. Particularly, where the handle and handle lock structure is employed in a compact, portable working machine having excellent portability, it is necessary to stabilize the working machine when operating the lock cancellation levers; thus, the operation for retracting the handle to the stored position would require further labor.

SUMMARY OF THE INVENTION

In view of the foregoing prior art problems, it is an object of the present invention to provide an improved handle lock structure for a working machine which allows the towing handle of the machine to be readily retracted from the deployed position to the stored position with reduced labor by a human operator.

It is another object of the present invention to provide an improved handle lock structure for a working machine which allows the towing handle of the machine to be readily retained or locked in the deployed position.

In order to accomplish the above-mentioned object, the present invention provides an improved handle lock structure for a working machine which includes a towing handle comprising left and right handle sections mounted on opposite sides of a top section of a working machine body in such a manner that the handle is pivotally movable between a stored position where the handle is stored in the machine body and a deployed position where the handle is deployed from the stored position, the machine body being towable with the handle retained in the deployed position. The handle lock structure comprises: left and right lock members provided on the machine body for movement into engagement with engaging portions of the left and right handle sections, respectively, as the handle is pivotally moved in a deploying direction from the stored position toward the deployed position, thereby locking the left and right handle sections in the deployed position; and a single lock cancellation lever for moving the left and right lock members out of the engagement with the engaging portions of the left and right handle sections to compulsorily cancel locking, by the left and right lock members, of the left and right handle sections in the deployed position.

By a user or human operator merely operating the single lock cancellation lever, the locking, by the left and right lock members, of the left and right handle sections (and hence the handle) in the deployed position can be readily canceled. In this way, the left and right handle sections can be readily retracted or collapsed from the deployed position to the stored position with reduced labor by the human operator. Especially, even where the working machine is of a compact, portable type having superior portability (more specifically, movability responsive to towing force and transportability achieved by being carried in a vehicle), the present invention can readily retract the left and right handle sections (and hence the handle) from the deployed position to the stored position with reduced labor by the human operator, by allowing the human operator to readily cancel the locking of the left and right handle sections through simple operation of the single lock cancellation lever.

In one embodiment, the lock cancellation lever is provided in a machine-carrying grip that is provided on the machine body between the left and right handle sections and near and over an imaginary extension line of left and right support shafts pivotably mounting the left and right handle sections, respectively, on the opposite sides of the top section. With this arrangement, the user or human operator can operate the lock cancellation lever with his or her hand holding the machine-carrying grip. By the human operator holding the machine-carrying grip, the working machine body can be held stably, so that the human operator can operate the lock cancellation lever with ease and thereby readily retract the left and right handle sections to the stored position with reduced labor. Especially, even where the working machine is of a compact, portable type having superior portability, the human operator can retract the left and right handle sections to the stored position with reduced labor by holding the machine-carrying grip with the hand to thereby hold the working machine body stably.

Further, because the lock cancellation lever is provided in the machine-carrying grip, it can be located near and over the imaginary extension line of the left and right support shafts. Preferably, the left and right lock members are provided near the left and right support shafts. Thus, the lock cancellation lever can be provided near the left and right lock members, so that the handle lock structure can be simplified in construction.

In one embodiment, the left and right lock members are normally resiliently biased toward the left and right handle sections so as to automatically engage with the engaging portions of the left and right handle sections as the handle is pivotally moved in the deploying direction. With this arrangement, the left and right handle sections can be automatically locked in the deployed position. As a result, the human operator can readily extend the left and right handle sections to the deployed position with reduced labor.

In one embodiment, the left and right lock members are connected at their respective one end portions to the lock cancellation lever in such a manner that the left and right lock members are movable, together with pivoting movement of the lock cancellation lever, in interlocked relation to each other toward or away from the left and right handle sections. Also, the left and right lock members are normally biased at their respective other end portions by means of left and right springs in such a manner that the respective distal end portions resiliently engage with the engaging portions of the left and right handle sections as the handle is pivotally moved in the deploying direction. Further, the single lock cancellation lever may include an operating knob projecting from a body of the lock cancellation lever and operable by the human operator to move, against the biasing force of the left and right springs, the left and right lock members out of the engagement with the engaging portions of the left and right handle sections and thereby compulsorily cancel the locking, by the left and right lock members, of the left and right handle sections in the deployed position.

The following will describe embodiments of the present invention, but it should be appreciated that the present invention is not limited to the described embodiments and various modifications of the invention are possible without departing from the basic principles. The scope of the present invention is therefore to be determined solely by the appended claims.

BRIEF DESCRIPTION OF THE DRAWINGS

Certain preferred embodiments of the present invention will be described in detail below, by way of example only, with reference to the accompanying drawings, in which:

FIGS. 12A and 12B are views illustrating an example mode of pivotal movement of the handle body from a stored position toward a deployed position;

DETAILED DESCRIPTION OF THE PREFERRED EMBODIMENTS

Figure 1:
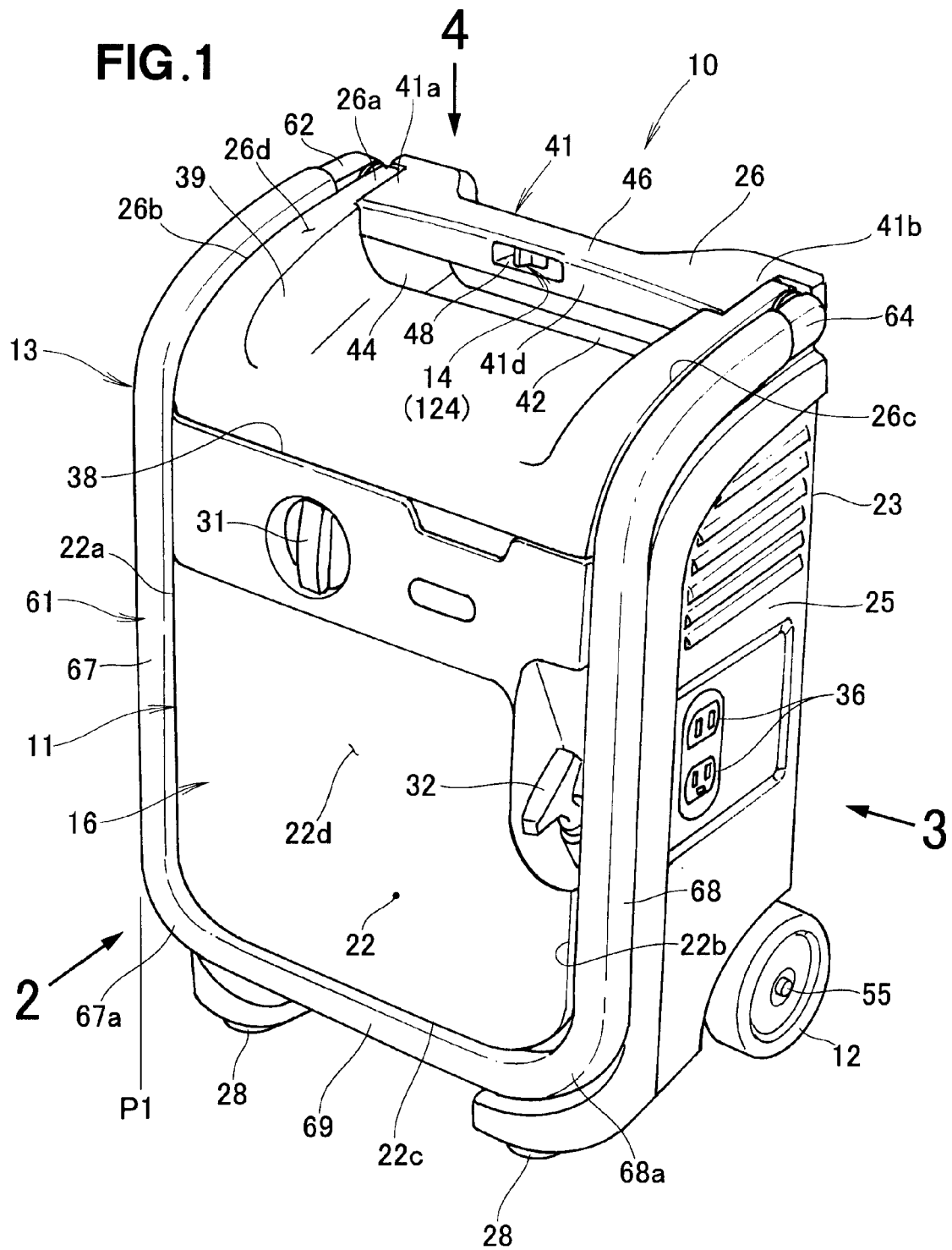
FIG. 1 is an overall perspective view showing a working machine equipped with a handle lock structure according to an embodiment of the present invention.
Figure 2:
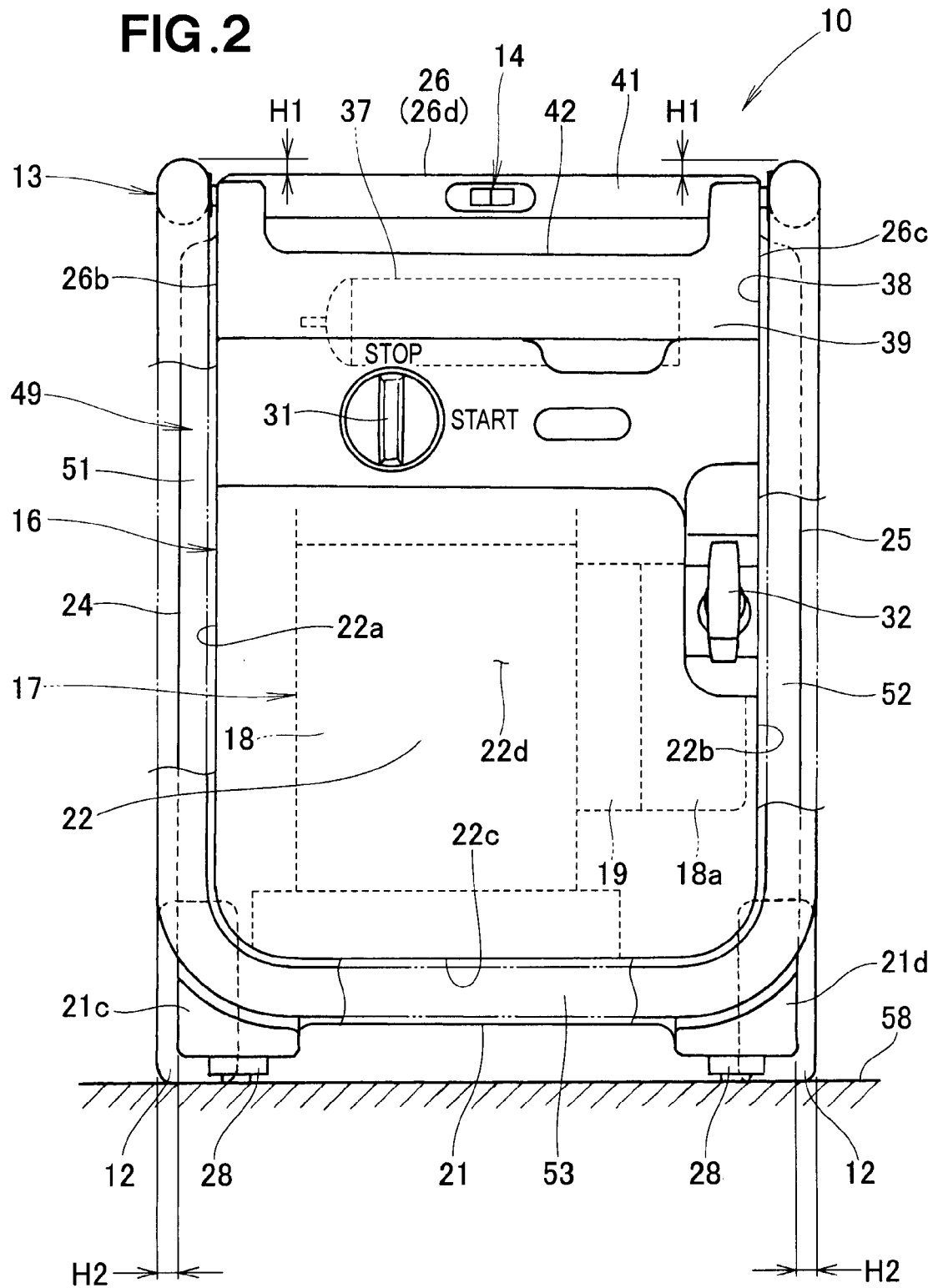
FIG. 2 is a view taken in the direction of arrow 2 of FIG. 1.

Reference is made initially to FIG. 1 showing in perspective a working machine equipped with a handle structure 13 (hereinafter referred to also as "working machine handle structure 13") according to an embodiment of the present invention, and to FIG. 2 being a view taken in the direction of arrow 2 of FIG. 1. In the illustrated example of FIG. 1, the working machine 10 is a portable, towing-type power generator, which includes: a working machine body 11 having a substantially rectangular parallelepiped contour or shape; left and right wheels 12 (the left wheel 12 is shown in FIG. 2) rotatably mounted on the machine body 11; the working machine handle structure 13 pivotably mounted on the machine body 11; and a handle lock structure 14 (see also FIG. 6) for retaining the handle structure 13 in a locked state or position.

The working machine body 11 includes a case 16 formed in a substantially rectangular parallelepiped shape, and an engine/generator unit 17 provided within the case 16.

As shown in FIGS. 2 to 5, the case 16 has: a bottom section 21 having a substantially rectangular shape as viewed in plan; a front wall section 22 extending upward from a front end region 21a of the bottom section 21; a rear wall section 23 extending upward from a rear end region (i.e., region near the end, in a machine-towing direction, the bottom section 21) 21b of the bottom section 21; a left side wall section 24 extending upward from a left end region 21c of the bottom section 21; a right side wall section 25 extending upward from a right end region 21d of the bottom section 21; and a top section 26 provided on the respective upper ends of the front and rear wall sections 22 and 23 and left and right side wall sections 24 and 25.

The front wall section 22, which is located adjoining the top section 26, has its upper end connecting with an end of the top section 26, and, as viewed in side elevation, the top section 26 arcuately extends from the upper end of the front wall section 22 generally in the machine-towing direction.

The front wall section 22 is an operating wall section where are provided an operation start/stop switch 31 and a starter knob 32. The operation stop/operation selection switch 31 is a rotary switch for switching the engine/generator unit 17 between an operating state and a non-operating state. The operation stop/operation selection switch 31 is a member that needs to be protected (i.e., to-be-protected member). The starter knob 32 is a to-be-protected member for activating a recoil starter 18a (FIG. 2) that in turn activates the engine/generator unit 17.

Figure 4:
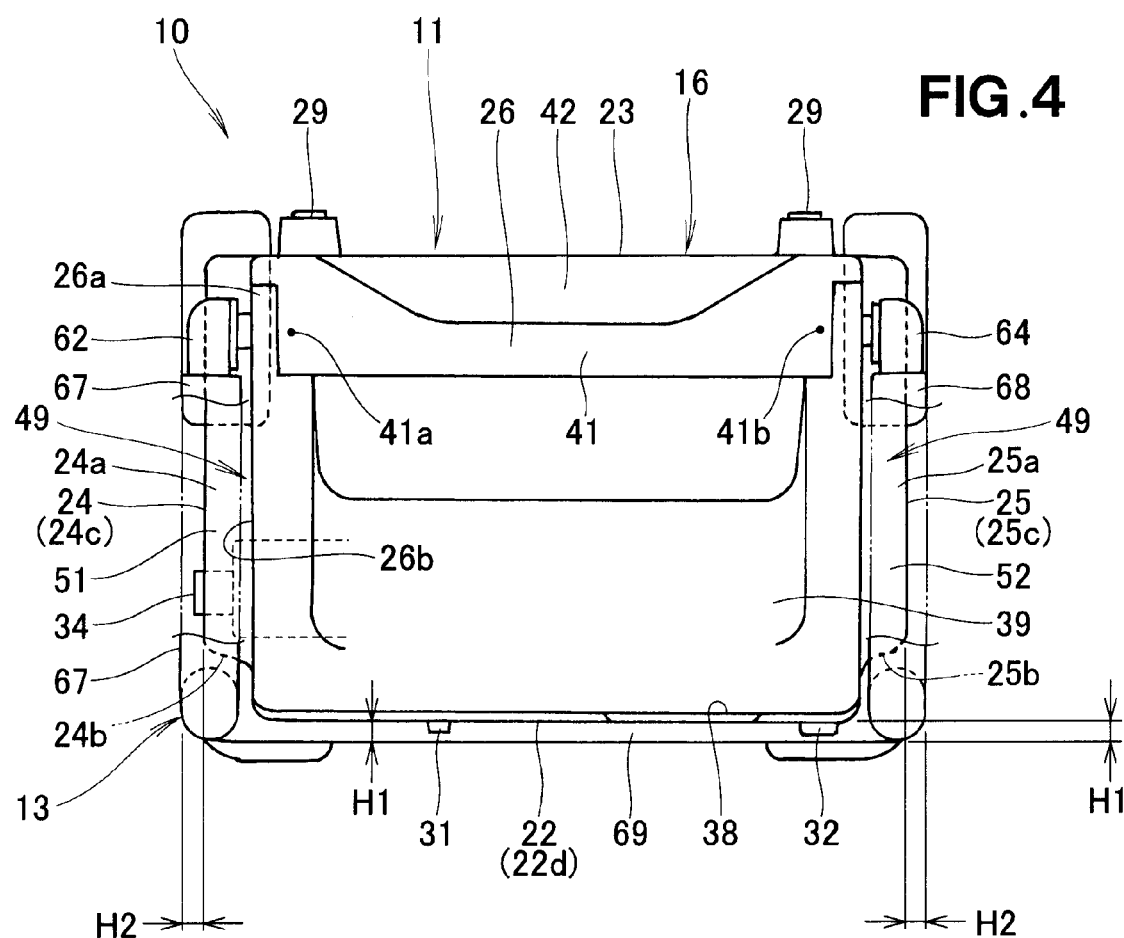
FIG. 4 is a view taken in the direction of arrow 4 of FIG. 1.

A maintenance cover (not shown) for permitting repair and inspection of the working machine 10 is provided substantially centrally on the rear wall section 23. A later-described grip 41, which is provided on the machine body 11 as part of the top section 26, is connected at opposite ends to upper-end left and right side portions of the rear wall section 23. Further, as best seen in FIG. 4, left and right carrying foot portions 29 are provided near the upper end of the rear wall section 23.

The left and right carrying foot portions 29 are designed to contact the floor surface of a trunk or luggage compartment 146 (Fig.) of a vehicle 145, for example, when the working machine 10 is put in the vehicle 145 in a posture or position inclined about 90 degrees (i.e., in a laid-down position). In this way, the vertically-elongated working machine 10 can be put in the luggage compartment 146 in a stable manner using the left and right carrying foot portions 29 and left and right wheels 12.

The left side wall section 24 is an exhaust discharging side wall section having an exhaust outlet 34 (FIG. 4) formed therein. The exhaust outlet 34 is also a to-be-protected member for discharging exhaust gas of an engine 18 included in the engine/generator unit 17.

Figure 3:
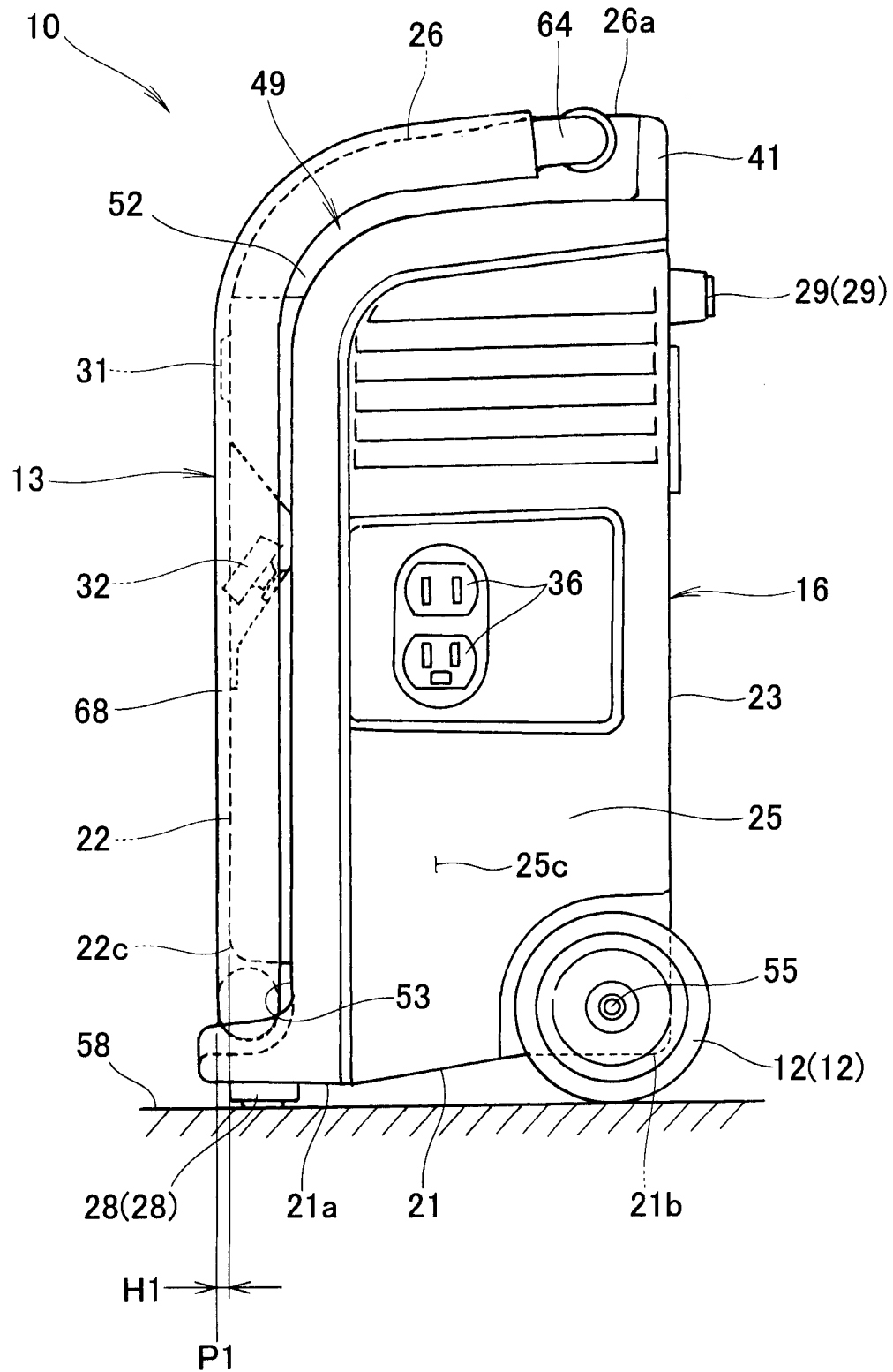
FIG. 3 is a view taken in the direction of arrow 3 of FIG. 1.
Figure 5:
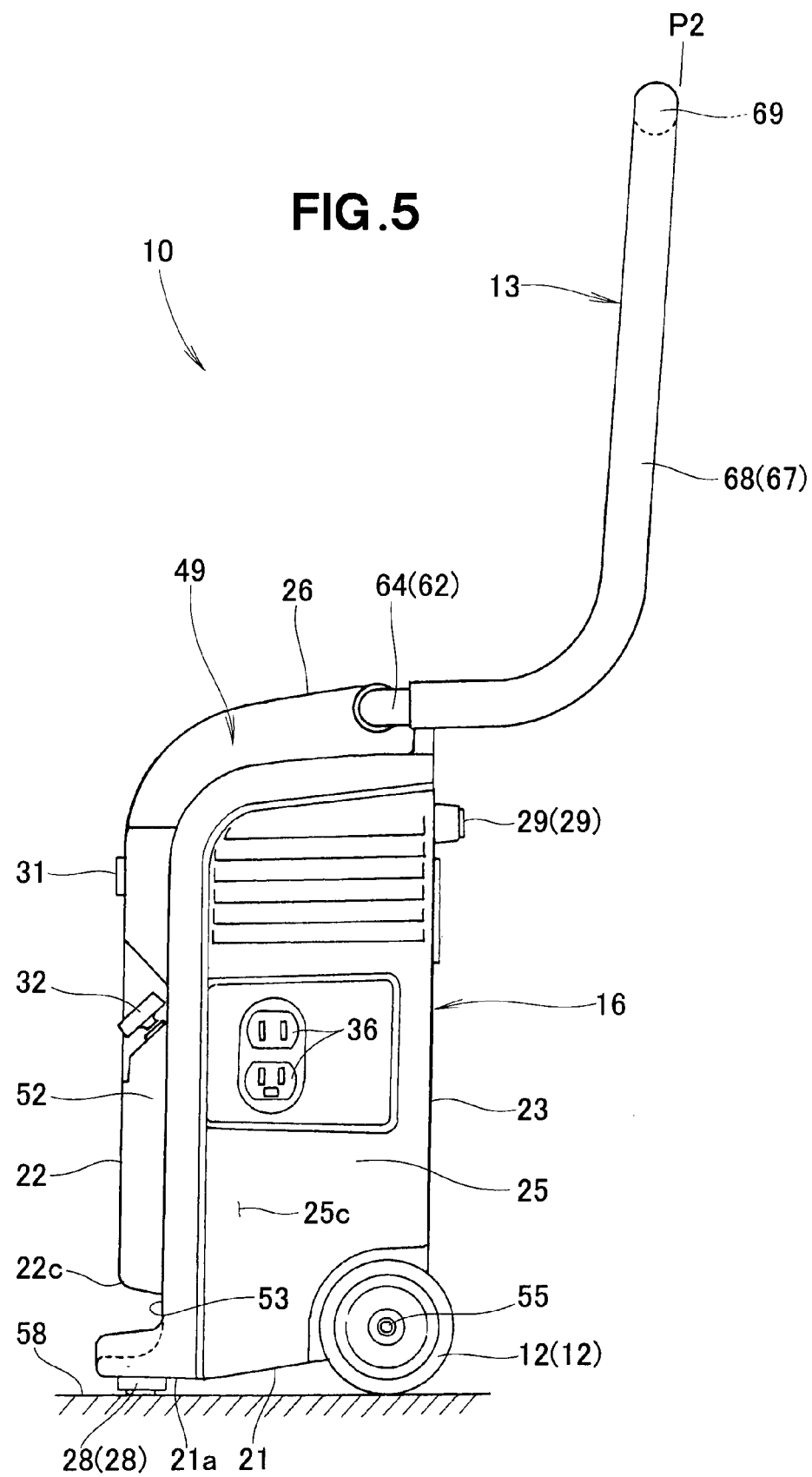
FIG. 5 is a side view showing a handle body of the handle structure shown in FIG. 3 extended to a deployed position.

The right side wall section 25 is an electric-power taking-out side wall section having electric outlets 36 provided thereon, as best seen in FIGS. 3 and 5. The electric outlets 36 are also to-be-protected members for taking out electric power generated by the engine/generator unit 17.

The top section 26 includes an opening portion 38 for accommodating therein a cassette gas cylinder or canister 37 (FIG. 2), a cover portion 39 covering the opening portion 38, and a machine-carrying grip 41. The cassette gas canister 37 is a replaceable to-be-protected member having gas filled therein for use as fuel of the engine 18. The top section 26 also has a recessed portion 42 (see also FIGS. 1 and 11) formed in a rear end region 26a adjacent to the end, in the machine-towing direction, of the top section 26, and the grip 41 is located over the recessed portion 42.

Figure 6:
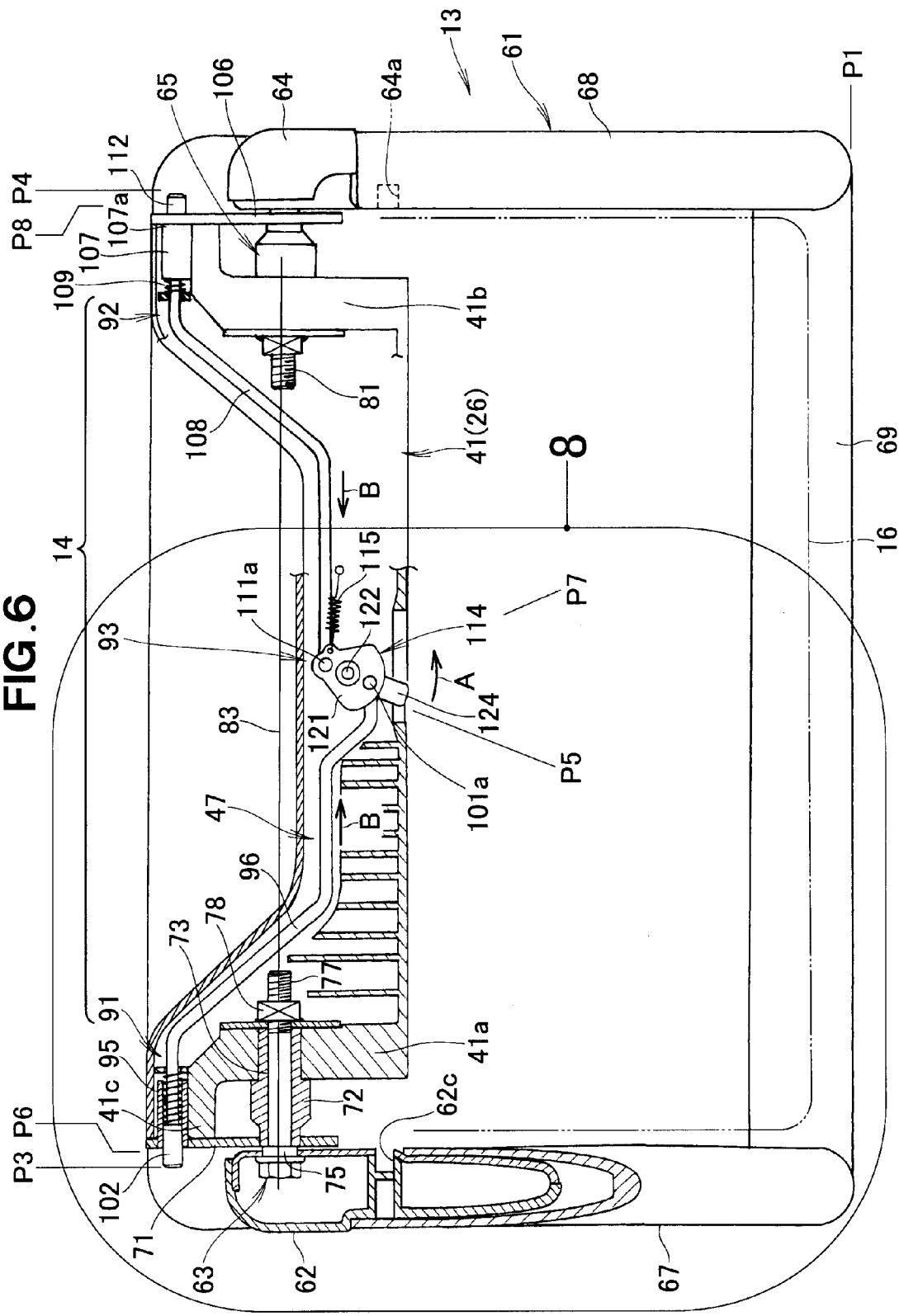
FIG. 6 is a side view showing the handle body retained in a stored position without being locked by the handle lock structure.

As seen in FIG. 1, the grip 41 is a bar-shaped member secured at its left and right ends to the upper-end left and right side portions of the rear wall section 23 and extending between the upper-end left and right side portions of the rear wall section 23 over the recessed portion 42. More specifically, the grip 41 has a left foot portion 44 (see also FIG. 11) secured to the upper-end left side portion of the rear wall section 23, a right foot portion (not shown) secured to the upper-end right side portion of the rear wall section 23, and a straight grip body portion 46 formed integrally with and extending or spanning between the left foot portion 44 and right foot portion. The grip body portion 46 has a later-described hollow portion formed therein to extend in a longitudinal (or left-right) direction thereof, as seen in FIG. 6.

Figure 18A:
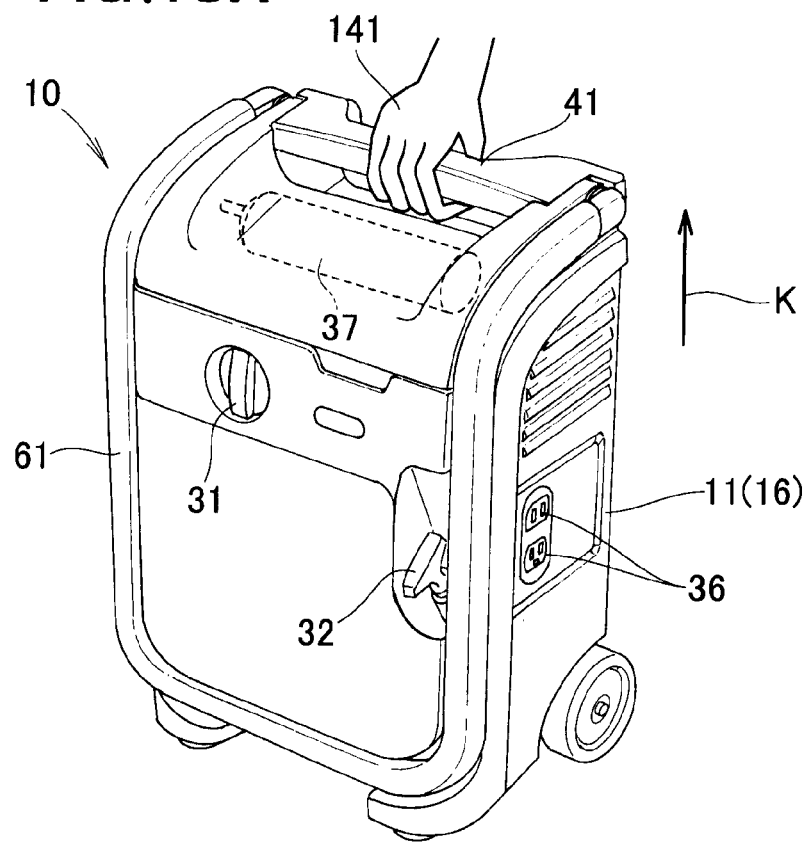
FIGS. 18A and 18B are views illustrating an example manner of putting the working machine having the handle structure into a luggage compartment.
Figure 18B:
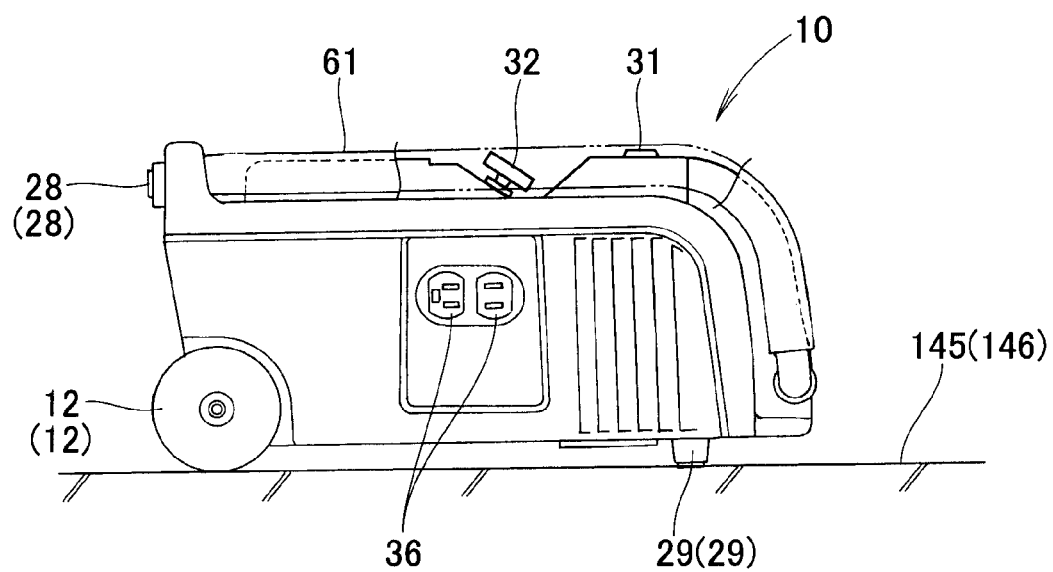

By a human operator or user holding the grip 41 and lifting up the working machine 10, the working machine 10 can be put into the luggage compartment 146 (FIG. 18B).

As shown in FIGS. 2 to 5, a recessed section 49 for storing therein a later-described handle body (machine-towing handle) 61 is formed in the case 16 along the outer periphery of the case 16. The handle-storing recessed section 49 has a left storing recessed portion 51 formed in a left side (outer peripheral) portion 26b of the top section 26 and in a left side (outer peripheral) portion 22a of the front wall section 22; a right storing recessed portion 52 formed in a right side (outer peripheral) portion 26c of the top section 26 and in a right side (outer peripheral) portion 22b of the front wall section 22; and a bottom storing recessed portion 53 formed in a lower end (outer peripheral) portion 22c of the front wall section 22.

The left and right storing recessed portions 51 and 52 are formed in left-right symmetrical relation to each other, and each of the storing recessed portions 51 and 52 has a substantially L shape as viewed in side elevation; details of the right storing recessed portion 52 are seen in FIGS. 3 and 5. The bottom storing recessed portion 53 is formed to extend horizontally in the left-right direction as viewed in front elevation (see FIG. 2).

As shown in FIG. 2, the handle-storing recessed section 49 is a continuous recessed section having a substantially U shape, as viewed in front elevation, defined with the left and right storing recessed portions 51 and 52 and bottom storing recessed portion 53.

As further shown in FIG. 2, the engine/generator unit 17 comprises an integral combination of the engine 18 mounted on the bottom section 21 and a power generator 19 drivable by the engine 18. In the illustrated example, the engine 18 is a gas engine drivable by gas supplied by the cassette gas canister 37. In the engine/generator unit 17, the engine 18 rotates the rotor of the power generator 19 around the outer periphery of the stator so that electric power can be generated.

Further, as shown in FIGS. 2 and 3, the left wheel 12 is a machine-towing wheel rotatably mounted on the left side of the rear end region 21b of the bottom section 21 (i.e., corner portion defined between the bottom section 21 and the rear wall section 23) via a rotation shaft 55. Similarly, the right wheel 12 is a machine-towing wheel rotatably mounted on the right side of the rear end region 21b of the bottom section 21 via the rotation shaft 55.

The rear end region 21b of the bottom section 21 is near the end, in the machine-towing direction, of the bottom section 21. Namely, the left and right wheels 12 are rotatably mounted on the end region 21b located near the end, in the machine-towing direction, of the bottom section 21. The left and right wheels 12 are members provided in left-right symmetric relation to each other.

Further, left and right foot portions 28 are provided on the underside of the front end region 21a of the bottom section 21. The working machine 10 can be retained stable in a vertically upright position with the left and right foot portions 28 and left and right wheels 12 placed on a road surface 58.

As shown in FIGS. 1 and 4, the handle structure 13 is mounted on opposite sides of the top section 26 of the working machine body 11. The handle structure 13 includes: the handle body (i.e., machine-towing handle) 61 that can be stored along outer peripheral portions of the case 16; a left support section 63 (FIG. 6) that pivotably supports a left base section 62 of the handle body 61 on a left end portion 41a of the grip 41 (hereinafter referred to as "left grip end portion 41a"); and a right support section 65 (FIG. 6) that pivotably supports a right base section 64 of the handle body 61 on a right end portion 41b of the grip 41 (hereinafter referred to as "right grip end portion 41b").

The left and right support sections 63 and 65 are provided in left-right symmetric relation to each other, and, thus, the following mainly describe in detail the left support section 63.

The handle body 61 includes: a left handle section 67 where the left base section 62 is rotatably supported on the left grip end portion 41a (i.e., left end portion of the top section 26); a right handle section 68 where the right base section 64 is rotatably supported on the right grip end portion 41b (i.e., right end portion of the top section 26); and a handle grip 69 integrally connecting between the respective distal ends 67a and 68a of the left and right handle sections 67 and 68. The handle body (machine-towing handle) 61 is pivotably mounted on end portions, in the machine-towing direction, of the top section 26.

In the left handle section 67, the left base section 62 is rotatably supported on the left grip end portion 41a by means of the left support section 63 (see FIG. 6), and the left handle section 67 is formed in a substantially L shape as viewed in side elevation such that it can be stored in the left storing recessed portion 51 (FIG. 2).

With the left handle section 67 stored in the left storing recessed portion 51 (i.e., retracted to a stored position P1 as shown in FIGS. 6 and 3), the left handle section 67 is disposed along the left side (outer peripheral) portion 26b of the top section 26 and along the left side (outer peripheral) portion 22a of the front wall section 22.

Further, with the left handle section 67 in the stored position P1, the left handle section 67 projects outwardly (i.e., upwardly) beyond the upper end surface 26d of the top section 26 by a projecting length H1 (FIG. 2) and projects outwardly (i.e., forwardly) beyond the front end surface 22d of the front wall section 22 by a projecting length H1 (FIG. 3).

Further, with the left handle section 67 in the stored position P1, the left handle section 67 is disposed along the upper end (outer peripheral) portion 24a and front end (outer peripheral) portion 24b of the left wall section 24.

Furthermore, with the left handle section 67 in the stored position P1, the left handle section 67 projects outwardly (leftwardly) beyond the left end surface 24c of the left wall section 24 by a projecting length H2, and the left wheel 12 projects outwardly (leftwardly) beyond the left end surface 24c of the left wall section 24 by the projecting length H2, as shown in FIGS. 2 and 4.

In the right handle section 68, the right base section 64 is rotatably supported on the right grip end portion 41b by means of the right support section 65 (FIG. 6), and the right handle section 68 is formed in a substantially L shape as viewed in side elevation such that it can be stored in the right storing recessed portion 52.

With the right handle section 68 stored in the right storing recessed portion 52 (i.e., stored in a stored position P1), the right handle section 68 is disposed along the right side (outer peripheral) portion 26c of the top section 26 and along the right side (outer peripheral) portion 22b of the front wall section 22.

With the right handle section 68 in the stored position P1, the handle 26 projects outwardly (i.e., upwardly) beyond the upper end surface 26d of the top section 26 and projects outwardly (i.e., forwardly) beyond the front end surface 22d of the front wall section 22 by the projecting length H1.

Further, with the right handle section 68 in the stored position P1, the right handle section 68 is disposed along an upper end (outer peripheral) portion 25a and front end (outer peripheral) portion 25b of the right wall section 25.

Furthermore, with the right handle section in the stored position P1, the right handle section 68 projects outwardly (rightwardly) beyond the right end surface 25c of the right wall section 25 by a projecting length H2, and the right wheel 12 projects outwardly (rightwardly) beyond the right end surface 25c of the right wall section 25 by the projecting length H2.

The handle grip 69 is disposed horizontally as viewed in front elevation so that it can be stored in the bottom storing recessed portion 53 (FIG. 3). With the handle grip 69 stored in the bottom storing recessed portion 53 (i.e., stored in the stored position P1), the handle grip 69 is disposed along the lower end (outer peripheral) portion 22c of the front wall section 22.

With the handle grip 69 in the stored position P1, the handle grip 69 projects outwardly (forwardly) beyond the front end surface 22d of the front wall section 22 by the projecting length H1.

With the left handle section 67 and right handle section 68 projecting outwardly beyond the upper end surface 26d of the top section 26 by the projecting length H1 (FIG. 2), the cassette gas canister (to-be-protected member) 37 can be protected with the left handle section 67 and right handle section 68.

Further, with the left and right handle sections 67 and 68 and the handle grip 69 (namely, handle body 61) projecting outwardly (forwardly) beyond the front end surface 22d of the front wall section 22 by the projecting length H1 (FIG. 3), the operation start/stop switch (to-be-protected member) 31 and the starter knob (to-be-protected member) 32 can be protected with the handle body 61.

Furthermore, the handle body 61 can also be used as a member for protecting the to-be-protected members, such as the cassette gas canister 37, operation start/stop switch 31 and starter knob 32.

With the aforementioned arrangements, the instant embodiment can reliably protect the to-be-protected members, such as the cassette gas canister 37, operation start/stop switch 31 and starter knob 32, without providing dedicated guard members and thus can avoid an increase in the number of necessary component parts.

Further, with the left handle section 67 projecting outwardly (leftwardly) beyond the left end surface 24c of the left wall section 24 by the projecting length H2, the exhaust outlet 34 (FIG. 4), which is another to-be-protected member, can be protected with the left handle section 67. The exhaust outlet 34 (FIG. 4) can be protected even more effectively with the left wheel 12 projecting outwardly (leftwardly) beyond the left end surface 24c of the left wall section 24 by the projecting length H2.

Furthermore, with the right handle section 68 projecting outwardly (rightwardly) beyond the right end surface 25c of the right wall section 25 by the projecting length H2, the electric outlets 36, which are also to-be-protected members, can be protected with the right handle section 68. The electric outlets 36 can be protected even more effectively with the right wheel 12 projecting outwardly (rightwardly) beyond the right end surface 25c of the right wall section 25 by the projecting length H2.

Thus, the aforementioned arrangements permit provision of the to-be-protected exhaust outlet 34 and electric outlets 36 on the left and right side wall sections 24 and 25 and thereby achieve an enhanced design freedom of the working machine.

Additionally, the left handle section 67 can be used also as a member for protecting the exhaust outlet 34, and the right handle section 68 can be used also as a member for protecting the electric outlets 36.

With such arrangements too, the instant embodiment can reliably protect the exhaust outlet 34 and electric outlets 36 without providing dedicated members and thus can avoid an increase in the number of necessary component parts.

Figure 7:
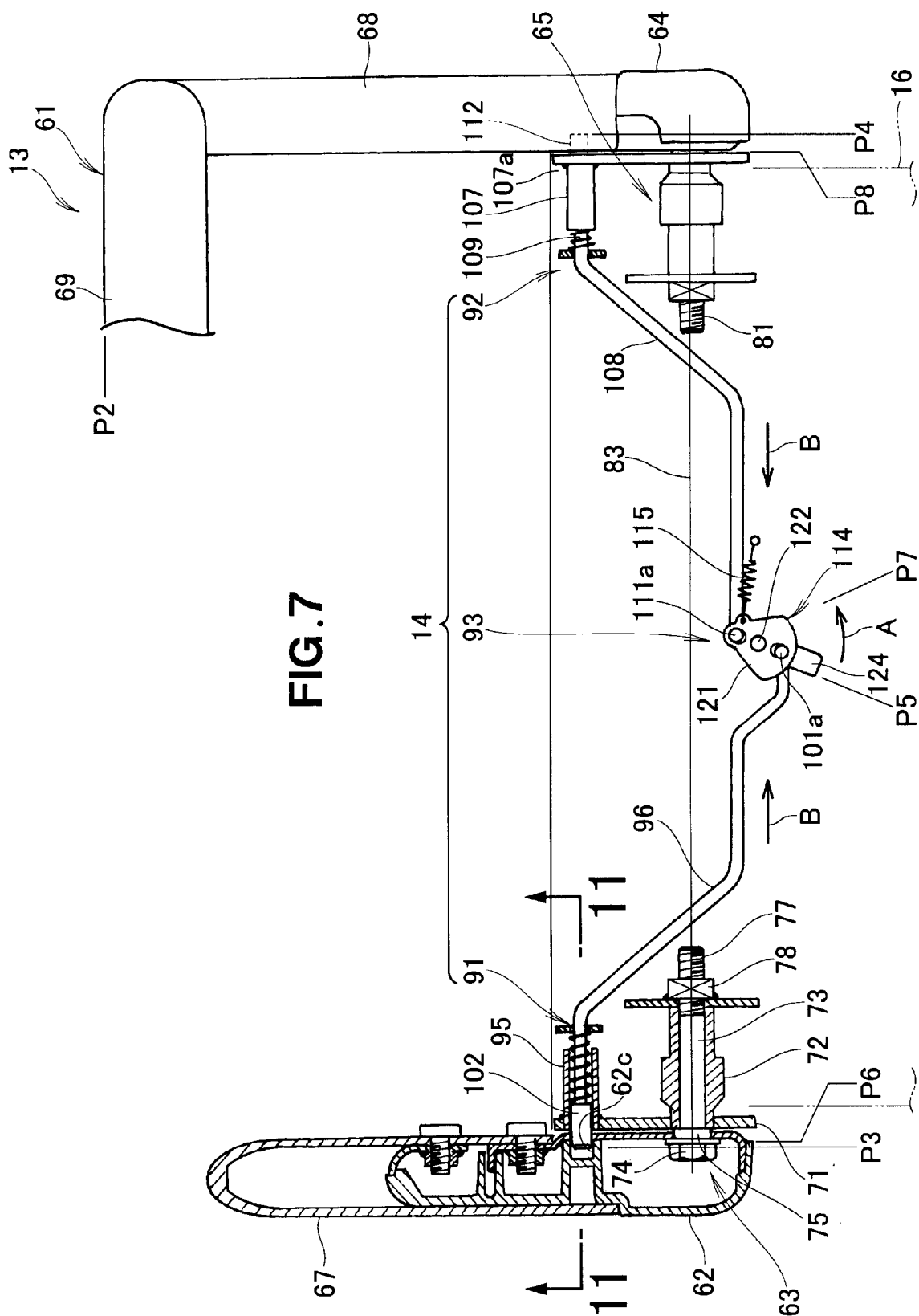
FIG. 7 is a sectional view showing the handle body retained in the deployed position by the handle structure.
Figure 8:
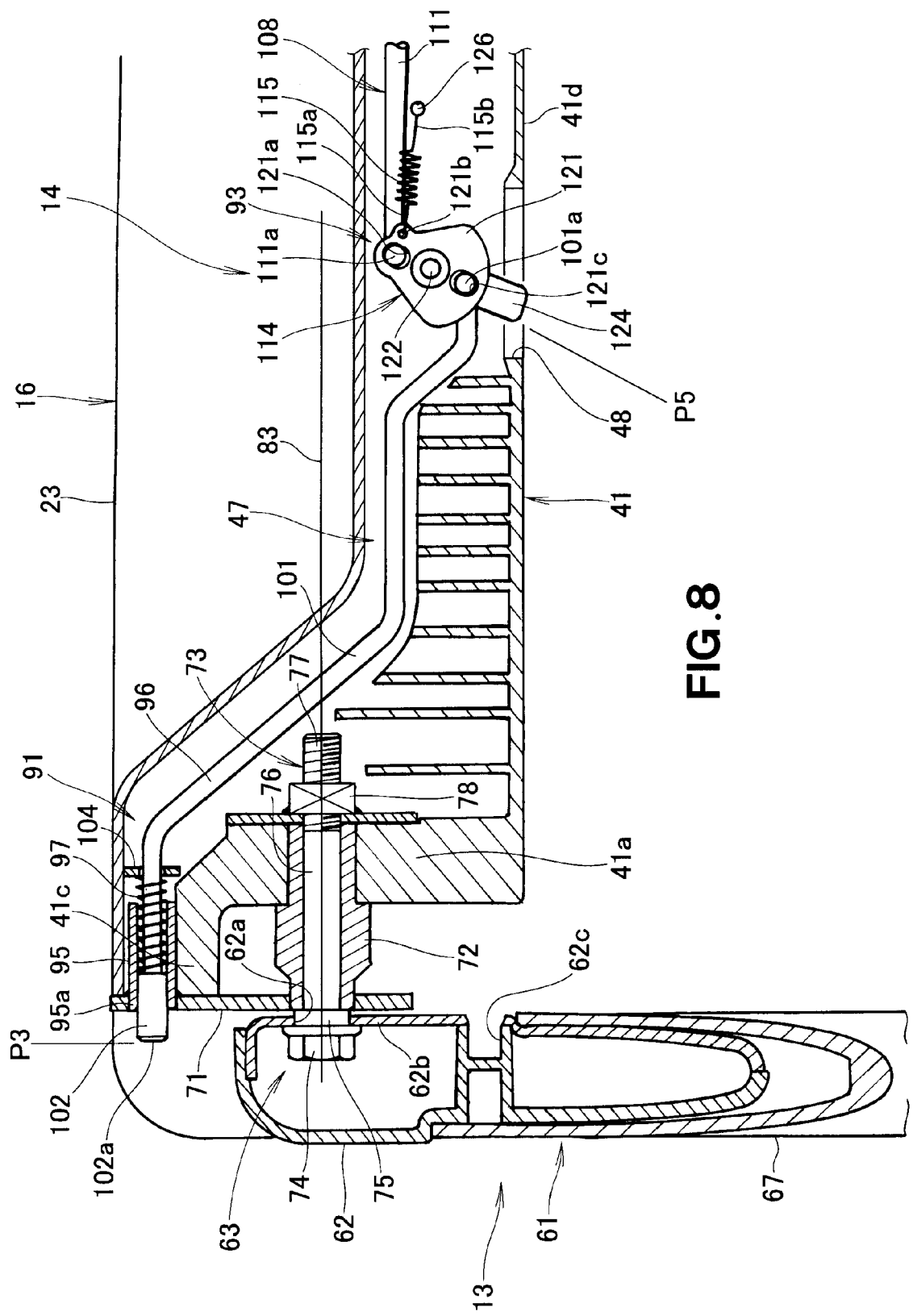
FIG. 8 is a fragmentary enlarged view of a section depicted at 8 in FIG. 6.

As shown in FIGS. 6 to 8, the left support section 63 includes: a left support bracket 71 abutted against a projection 41c of the left grip end portion 41a; a left supporting member 72 of a cylindrical shape projecting from the left support bracket 71 to the left grip end portion 41a; and a left support shaft 73 extending through the supporting member 72 to pivotably support or mount the left base section 62 of the left handle section 67 on the machine body 11.

The projection 41c projects leftward from the rear end of the left grip end portion 41a. The left support shaft 73 has an increased-diameter portion 75 provided adjacent to its head portion 74, and a threaded portion 77 provided on a distal end region of its support shaft portion 76.

The increased-diameter portion 75 is fitted in a mounting hole 62a of the left base section 62, the support shaft portion 76 is passed through the supporting member 72, and the threaded portion 77 projecting beyond the supporting member 72 is screwed to a welded nut 78. In this manner, a mounting portion 62b of the left base section 62 is pivotably supported on the increased-diameter portion 75, and thus, the left handle section 67 is supported on the left grip end portion 41a in such a manner that it is pivotable about the support shaft 73.

Because the threaded portion 77 is screwed to the welded nut 78, frictional force is produced between the mounting portion 62b of the left base section 62 and the head 74 and between the mounting portion 62b and the left support bracket 71. With such frictional force, the left handle section 67 can be held in a desired position.

Furthermore, the left base section 62 has a left engaging hole (i.e., engaging portion of the left handle section 67) 62c in which a later-described left lock pin portion 102 is engaged (fitted).

Similarly to the left handle section 67, the right handle section 68 is supported on the right grip end portion 41b in such a manner that it is pivotable about a support shaft 81 of the right support section 65. Further, the right handle section 68 can be held in a desired position with frictional force, similarly to the left handle section 67.

Furthermore, the right base section 64 has a right engaging hole (i.e., engaging portion of the right handle section 68) 64a in which a later-described right lock pin portion 112 is engaged (fitted).

With the aforementioned arrangements, the handle body 61 is supported on the left and right grip end portions 41a and 41b (i.e., on left and right end portions of the rear end region 26a of the top section 26), via the left and right support shafts 73 and 81, in such a manner that it can vertically pivot about the left and right support shafts 73 and 81 and can be held in a desired position.

Note that the left and right grip end portions 41a and 41b constitute left and right end portions of the rear end region 26a of the top section 26; in other words, the left and right grip end portions 41a and 41b are end portions, in the machine-towing direction, of the machine body 11.

Namely, the handle body 61 is pivotably mounted at its left and right base sections 62 and 64 on the end portions, in the machine-towing direction, of the machine body (i.e., on the left and right grip end portions 41a and 41b). In other words, the grip 41 is disposed between the left and right handle sections 67 and 68 (more specifically, between the left and right base sections 62 and 64), and the grip 41 is located near and over an imaginary extension line 83 of the left and right support shafts 73 and 81 pivotably supporting or mounting the left and right handle sections 67 and 68 on the machine body 11.

According to the above-described handle structure 13, the handle body 61 is pivotally movable between the stored position P1 (FIG. 3) where the handle body 16 is stored in the case 16 and the deployed position P2 (FIG. 5) where the handle body 61 is deployed from the case 16, by the human operator pivoting the handle body 61 about the left and right support shafts 73 and 81. Further, the working machine body 11 can be towed by the human operator pulling the handle grip 69 of the handle body 61 extended to the deployed position P2.

The hollow portion 47 is formed in the machine-carrying grip 41 to extend in the longitudinal (left-right) direction of the grip 41, and the handle lock structure 14 is accommodated in the hollow portion 47.

Figure 9:
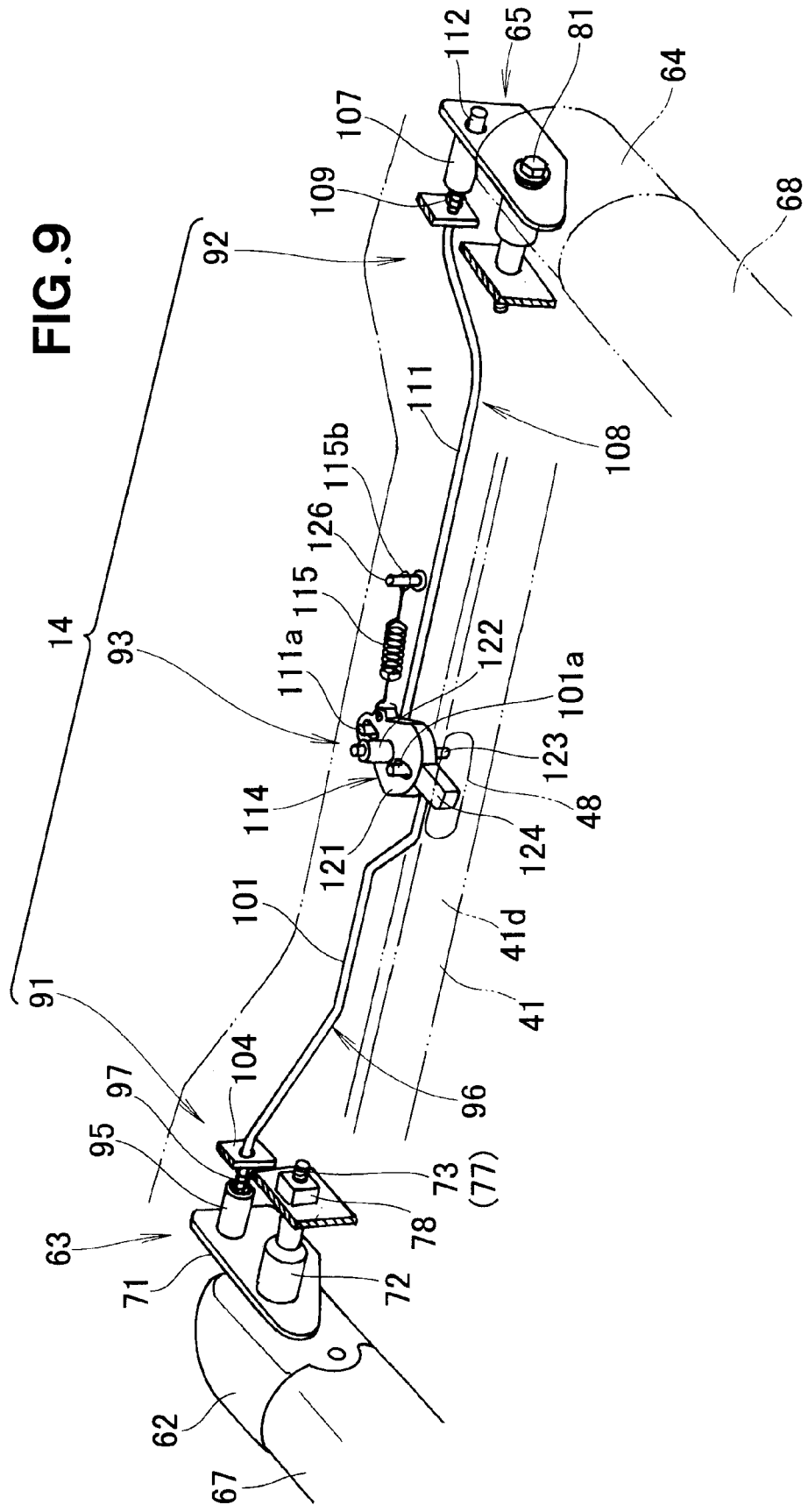
FIG. 9 is a perspective view showing the handle lock structure for locking the handle body of the handle structure.
Figure 10:
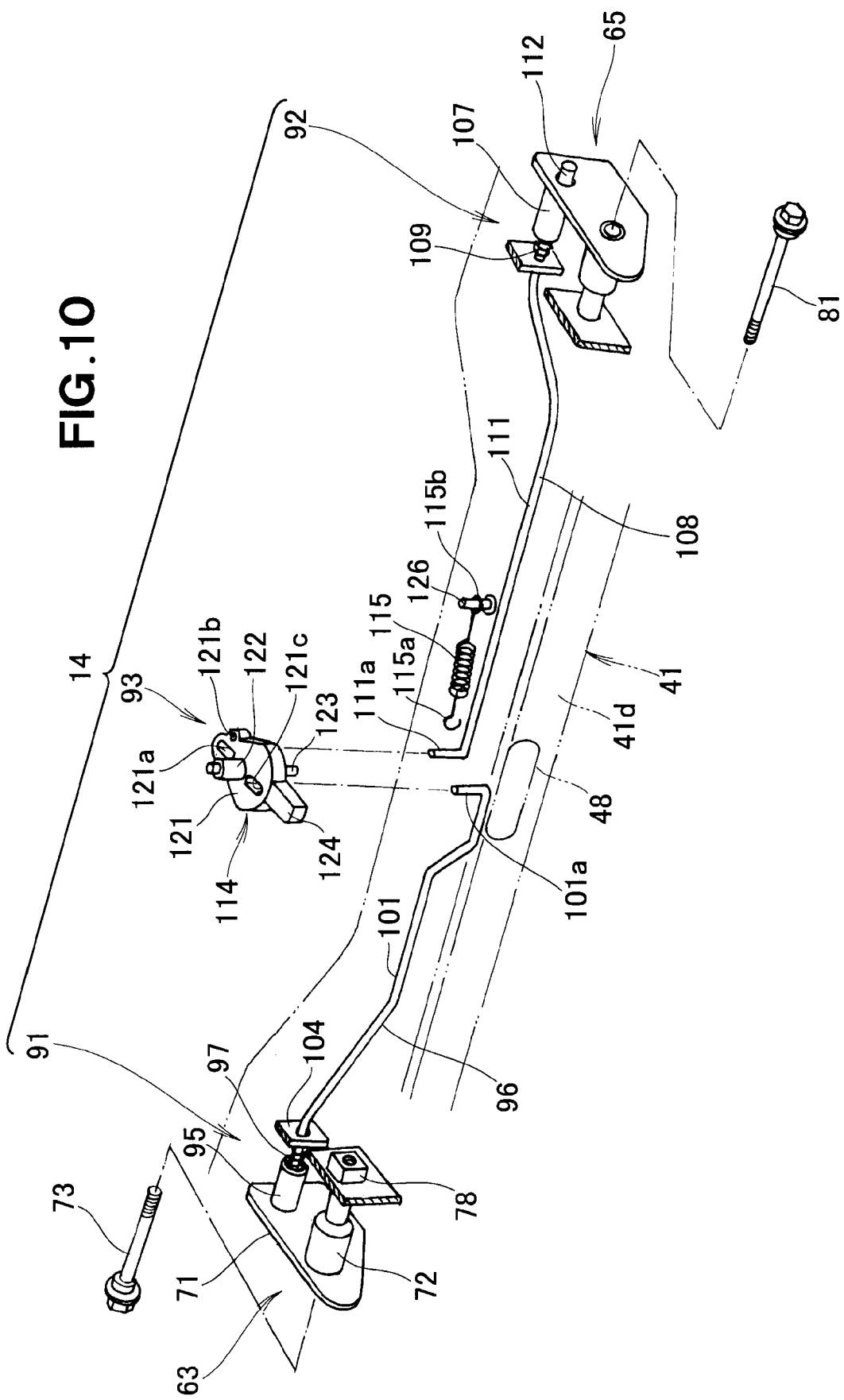
FIG. 10 is an exploded perspective view of the handle lock structure shown in FIG. 9.

As shown in FIGS. 9 and 10, the handle lock structure 14 includes a left lock section 91 for retaining (locking) the left handle section 67 in the deployed position P2 (FIG. 5), a right lock section 92 for retaining (locking) the right handle section 68 in the deployed position P2, and a lock cancellation section 93 for canceling the retention (locking), by the left and right lock sections 91 and 92, of the left and right handle sections 67 and 68.

As shown in FIG. 8, the left lock section 91 includes a left guiding portion 95 of a cylindrical shape provided on the left support bracket 71, a left lock member 96 (one of a pair of lock members) movably supported in part in the guiding portion 95, and a left return spring 97 for resiliently retaining the lock member 96 in a left lock position P3.

The left guiding portion 95 has its proximal end portion 95a provided on a rear end portion of the left support bracket 71, and it is located rearwardly of the left support shaft 73 and extends horizontally rightward along the rear wall section 23 of the case 16.

The left lock member 96 has a left rod-shaped body 101 accommodated in a left space of the hollow portion 47 of the grip 41, a distal end portion of the rod-shaped body 101 is provided as the left lock pin portion 102 and slidably supported in the guiding portion 95, and a proximal end portion 101a of the rod-shaped body 101 is bent vertically upward. The left lock pin portion 102 is an increased-diameter portion of the rod-shaped body 101, and the left return spring 97 has one end abutted against the inner surface of the left lock pin portion 102.

The left return spring 97 is fitted over a portion of the rod-shaped body 101 adjacent to the lock pin portion (distal end portion) 102 coaxially with the rod-shaped body 101 and with the guiding portion 95. The left return spring 97 is axially compressed between the left lock pin portion 102 and a stopper piece 104.

Biasing force of the left return spring 97 acts on the left lock pin portion 102 so that the left lock pin portion 102 is normally biased to the left lock position P3 projecting leftwardly beyond the proximal end portion 95a of the guiding portion 95. In this state, the left handle section 67 can be retained in the deployed position P2 (FIG. 5) with the left lock pin portion 102 locked in the engaging hole (engaging portion for the left handle section 67) 62c (i.e., with the engaging hole 62c engaged with the left lock pin portion 102).

As shown in FIGS. 6 and 7, the right lock section 92 includes a right guiding portion 107 of a cylindrical shape provided on a right support bracket 106, a right lock member 108 (the other of the pair of lock members) movably supported in part in the right guiding portion 107, and a right return spring 109 for resiliently retaining the right lock member 108 in a right lock position P4.

Biasing force of the right return spring 109 acts on the right lock pin portion (distal end portion) 112 of the right lock member 108 so that the right lock pin portion 112 is normally biased to the right lock position P4 projecting rightwardly beyond a proximal end portion 107a of the guiding portion 107. Thus, the right handle section 68 can be retained in the deployed position with the right lock pin portion 112 locked in the right engaging hole (engaging portion for the right handle section 68) 64a (i.e., with the right engaging hole 64a (engaging portion) engaged with the right lock pin portion 112).

The handle body 61 can be retained in the deployed position P2 by the left and right handle sections 67 and 68 being retained in the deployed position P2 by means of the left and right lock sections 91 and 92. The left and right lock sections 91 and 92 are members provided in left-right symmetric relation to each other and operating in the same manner, and thus, the following mainly describe in detail the left lock section 91.

As shown in FIGS. 8 to 10, the lock cancellation section 93 includes a single lock cancellation lever 114 for causing the left and right lock members 96 and 108 to operate in interlocked relation with each other toward or away from the left and right handle sections 67 and 68 and particularly for moving, in response to operation by the human operator, the left and right lock members 96 and 108 out of the engagement with the engaging portions 62c and 64a of the left and right handle sections 67 and 68, and a spring 115 for holding the lock cancellation lever 114 in a stable state.

The lock cancellation lever 114 is accommodated in a middle region, in the left-right direction, of the hollow portion 47 of the machine-carrying grip 41, i.e. in a horizontally middle region of the grip 41. The lock cancellation lever 114 includes an upper support pin 122 projecting upward from the upper surface of a lever body 121, a lower support pin 123 projecting downward from the lower surface of the lever body 121, a rear fitting hole 121a and engaging hole 121b formed in a rear end portion of the lever body 121, a front fitting hole 121c formed in a front end portion of the lever body 121, and an operating knob 124 projecting forward from the front end of the lever body 121.

The upper and lower support pins 122 and 123 are pivotably supported at their respective one ends on upper and lower wall portions, respectively, of the grip 41 defining the hollow portion 47, so that the lock cancellation lever 114 is pivotably mounted in the middle region of the hollow portion 47.

In the aforementioned state, the operating knob 124 slightly projects out of a grip opening 48 (see also FIG. 1). The grip opening 48 is in communication with the hollow portion 47 and opens centrally in a front wall portion 41d of the grip 41.

Further, a proximal end portion 111a of the right lock member 108 (i.e., proximal end portion of a right rod-shaped body 111) is inserted through the rear fitting hole 121a of the lock cancellation lever 114, while a proximal end portion 101a of the left lock member 96 (i.e., proximal end portion of the left rod-shaped body 101) is inserted through the front fitting hole 121c of the lock cancellation lever 114.

Furthermore, the above-mentioned holding spring 115 is fixedly engaged at one end 115a with the engaging hole 121b of the lock cancellation lever 114 and at the other end 115b with an engaging pin 126. The engaging pin 126 projects upwardly from a lower wall portion of the grip 41 defining the hollow portion 47.

With the proximal end portion 111a of the right rod-shaped body 111 inserted through (engaged with) the rear fitting hole 121a and the proximal end portion 101a of the left rod-shaped body 101 inserted through (engaged with) the front fitting hole 121c as noted above, the biasing force of the left and right return springs 97 and 109 acts on the lock cancellation lever 114.

With such biasing force of the left and right return springs 97 and 109, the operating knob 124 of the lock cancellation lever 114 is resiliently retained in a knob lock position P5 (FIG. 8).

Further, manufacturing and assembling errors of the lock cancellation lever 114 can be absorbed by the biasing force of the holding spring 115, so that the operating knob 124 can be accurately held still in the knob lock position P5.

The lock cancellation lever 114 provided in the machine-carrying grip 41 in the aforementioned manner can be located near and over the imaginary extension line 83 (FIG. 6) of the left and right support shafts 73 and 81.

As shown in FIG. 6, the left and right lock pin portions 102 and 112 are provided near the left and right support shafts 73 and 81, respectively, so that the lock cancellation lever 114 can be provided near the left and right lock pin portions 102 and 112.

With the aforementioned arrangements, the instant embodiment can simplify the shape of the left and right lock members 96 and 108 and constructions of link mechanisms etc. employed in the embodiment, thereby simplifying the construction of the handle lock structure 14.

Figure 11:
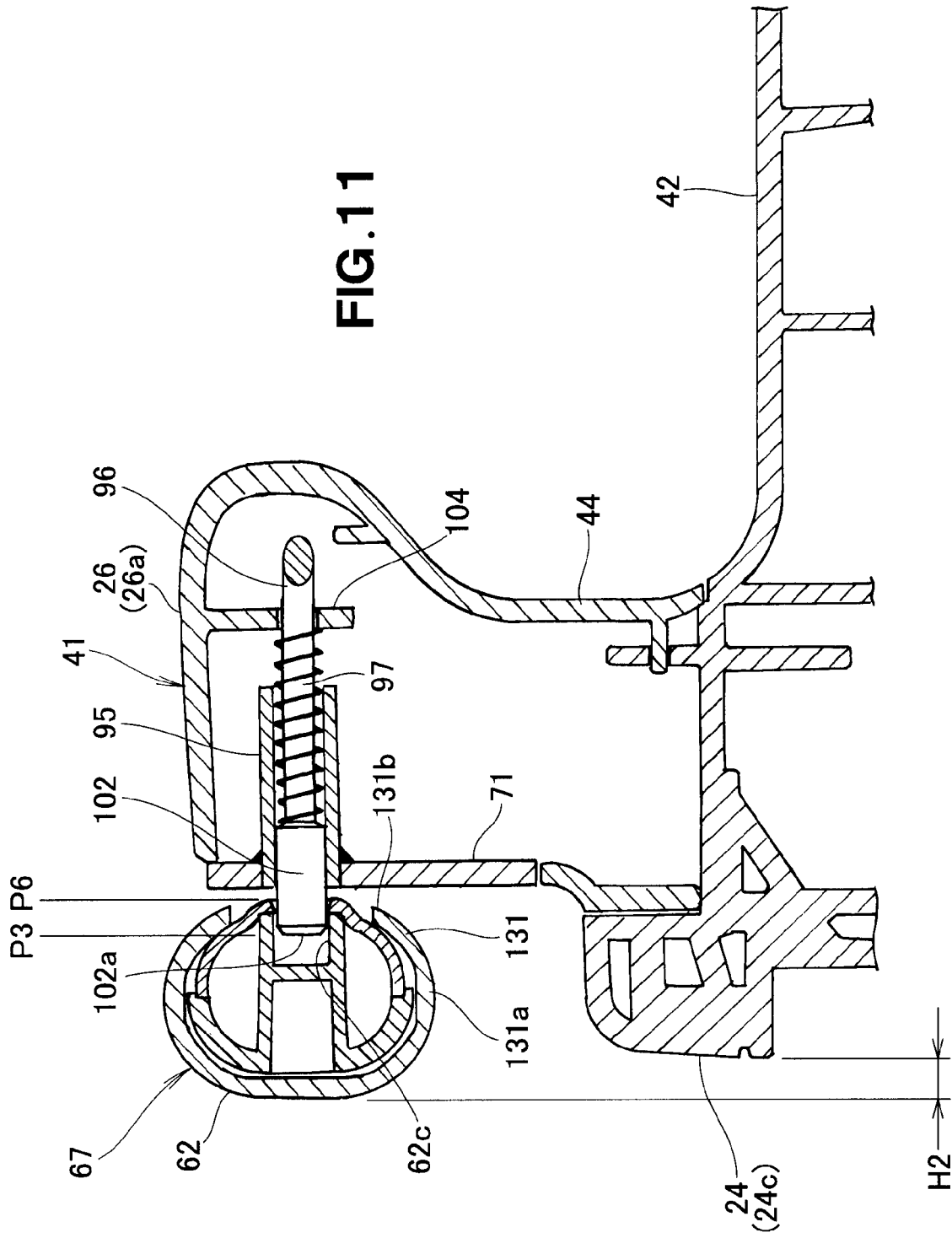
FIG. 11 is a sectional view taken along line 11-11 of FIG. 7.

Further, as shown in FIG. 11 which is a sectional view taken along the 11-11 line of FIG. 7, the left base section 62 of the left handle section 67 has a substantially ellipsoidal sectional shape, and a portion 131 of the base section 62 opposed to the left support bracket 71 is formed in a curved shape. The portion 131 is curved from its outer side region 131a toward its inner end 131b while gradually approaching the left support bracket 71.

Thus, as the left base section 62 of the left handle section 67 descends from above the left lock pin portion 102, the outer side region 131a of the curved portion 131 first abuts against the distal end 102a of the left lock pin portion 102. As the left base section 62 further continues to descend after the abutment against the distal end 102a of the left lock pin portion 102, the curved portion 131 pushes the left lock pin portion 102 into the guiding portion 95 so that the left lock pin portion 102 is located in a left lock cancellation position P6.

When the left base section 62 has been shifted to its deployed position, the engaging hole 62c is located coaxially with the left lock pin portion 102, so that the left lock pin portion 102 projects to the left lock position P3 by the biasing force of the left return spring 97. Thus, the left lock pin portion 102 is inserted into the left engaging hole 62c, so that the left engaging hole 62c is engaged by the left lock pin portion 102.

Therefore, as the left handle section 67 is extended to the deployed position P2 (see FIG. 5), the left lock pin portion 102 automatically engages with the left engaging hole (engaging portion) 62c, so that the left handle section 67 (and hence the handle body 61) can be retained or locked in the deployed position P2.

Further, as shown in FIGS. 6 and 7, the single operating knob 124 is movable, through operation by the human operator, in a direction of arrow A from the knob lock position P5 to a knob lock cancellation position P7. As the operating knob 124 is moved from the knob lock position P5 to the knob lock cancellation position P7 like this, the left and right lock pin portions 102 and 112 are pulled as indicated by arrows B toward the middle of the grip 41 against the biasing force of the left and right springs 97 and 109.

In the aforementioned manner, the left lock pin portion 102 moves from the left lock position P3 to the left lock cancellation position P6, while the right lock pin portion 112 moves from the right lock position P4 to a right lock cancellation position P8.

By the left lock pin portion 102 moving to the left lock cancellation position P6, the retention or locking, by the left lock section 91, of the left handle section 67 can be canceled. Similarly, by the right lock pin portion 112 moving to the right lock cancellation position P8, the retention or locking, by the right lock section 92, of the right handle section 68 can be canceled.

By cancelling the retained state of the left and right handle sections 67 and 68 as noted above, the handle body 61 can be caused to vertically pivot from the deployed position P2 (see FIG. 7) to the stored position P1 (see FIG. 6). Namely, the operating knob 124 of the single lock cancellation lever 114 is operable to compulsorily move, against the biasing force of the left and right springs 97 and 109, the left and right lock members out of the engagement with the engaging portions 62c and 64a of the left and right handle sections 67 and 68 and thereby cancel the locking, by the left and right lock members 96 and 108, of the left and right handle sections in the deployed position.

Next, with reference to FIGS. 12-14, a description will be given about an example manner in which the handle body 61 of the working machine 10 is extended to the deployed position P2.

As shown in FIG. 12A, the human operator pivotally moves the handle body 61 in a deploying direction, as indicated by arrow C, from the stored position P1 toward the deployed position P2 about the left and right support shafts 73 and 81 (see also FIG. 6). Thus, the handle body 61 (left and right handle sections 67 and 68) vertically pivots to a point immediately before the deployed position P2, as shown in FIG. 12B.

Figure 13A:
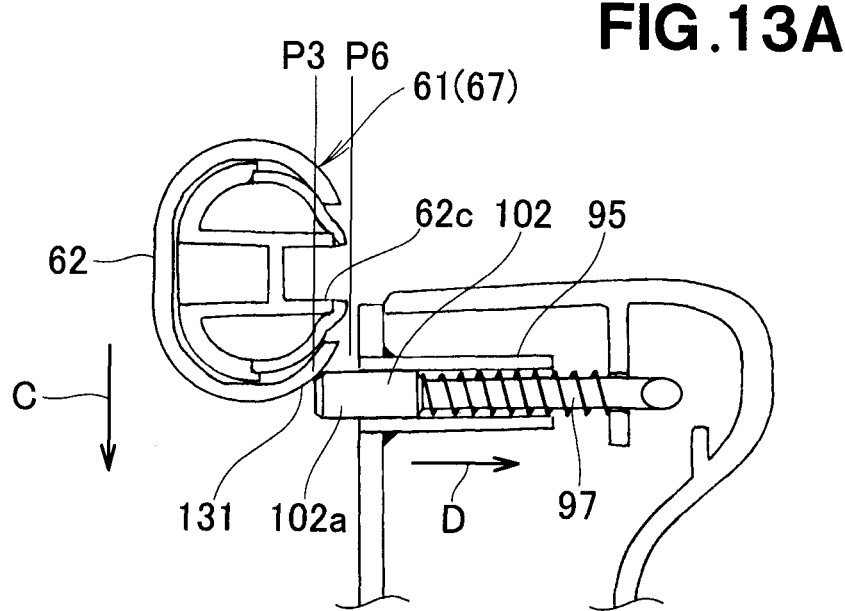
FIGS. 13A and 13B are views illustrating an example mode of retention of a left handle section in the deployed position.

Thus, as shown in FIG. 13A, the left base section 62 of the handle body 61 reaches a point above the left lock pin portion 102. Then, as the human operator further continues to pivot the handle body 61 toward the deployed position P2 (see FIG. 12B), the left base section 62 of the handle body 61 descends toward the left lock pin portion 102 as indicated by arrow C1 in FIG. 13A.

Thus, the curved portion 131 of the left base section 62 comes to abut against the distal end 102a of the left lock pin portion 102, so that the curved portion 131 presses the left lock pin portion 102 inwardly against the biasing force of the left return spring 97. By being pressed by the curved portion 131 like this, the left lock pin portion 102 moves from the left lock position P3 to the left lock cancellation position P6 as indicated by arrow D.

Figure 13B:
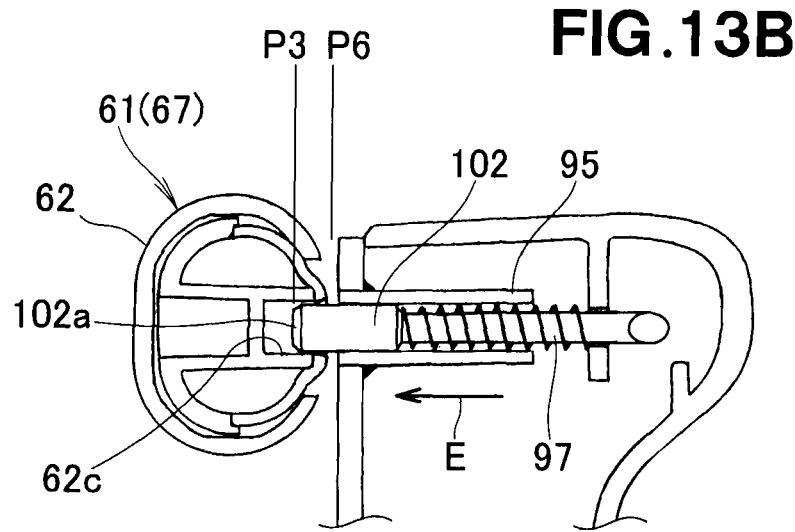

Then, as shown in FIG. 13B, the left base section 62 of the handle body 61 takes the deployed position P2, where the left engaging hole 62c is located coaxially with the left lock pin portion 102. Then, the left lock pin portion 102 projects to the left lock position P3, as indicated by arrow E, by the biasing force of the left return spring 97, so that the left lock pin portion 102 is inserted into the left engaging hole 62c and thus the engaging hole 62c is engaged by the inserted left lock pin portion 102.

Figure 14:
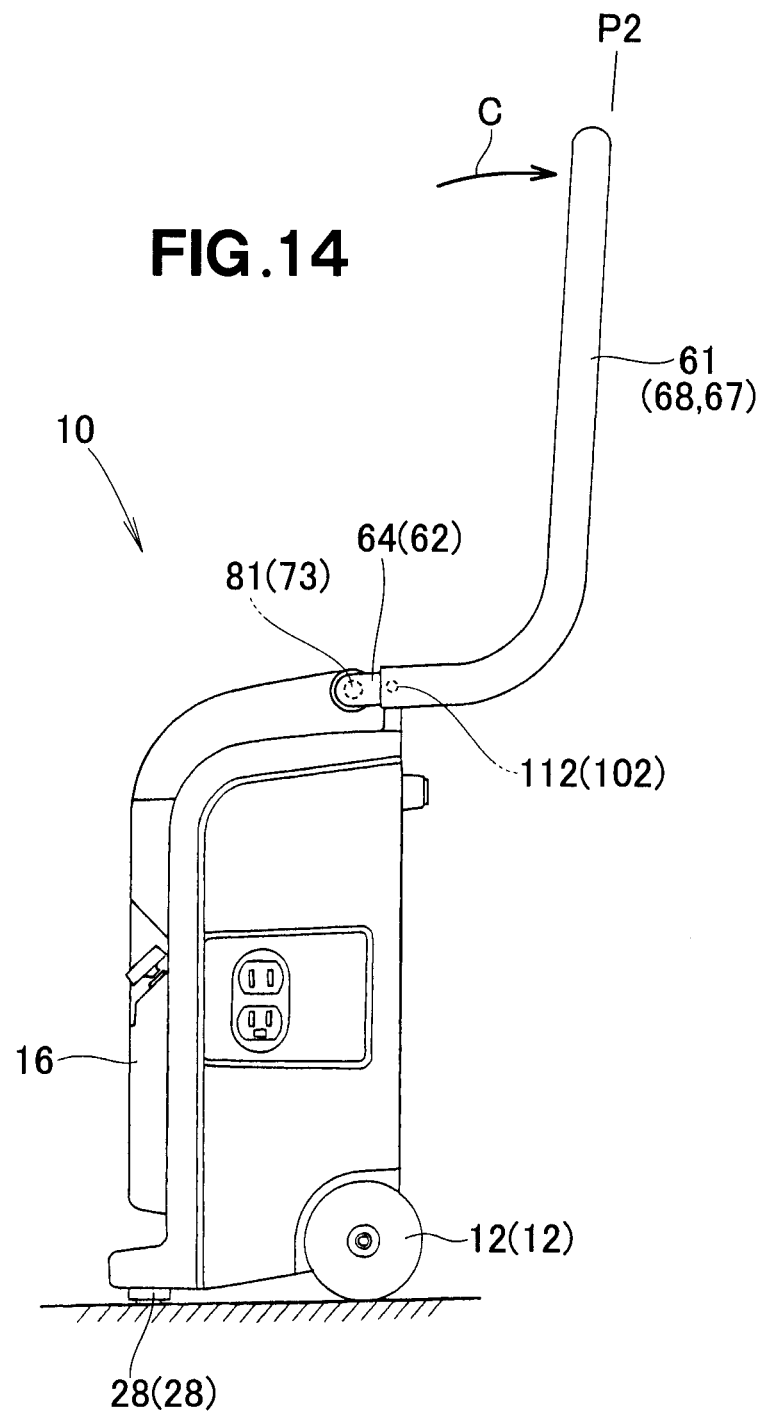
FIG. 14 is a view showing the handle body retained in the deployed position.

Thus, the left handle section 67 (namely, handle body 61) is positioned in the deployed position P2, as shown in FIG. 14. Then, the left handle section 67 can be retained or locked in the deployed position P2 with the left lock pin portion 102 automatically engaged with the left engaging hole 62c.

It should be appreciated that the right handle section 68 and other elements related to the right handle section 68 behave similarly to the left handle section 67 and other elements related to the left handle section 67. In the aforementioned manner, the handle body 61 can be readily extended from the stored position P1 to the deployed position P2 with reduced labor by the human operator.

Next, with reference to FIG. 15, a description will be given about an example manner in which the working machine 10 is towed with the handle body 61.

Figure 15A:
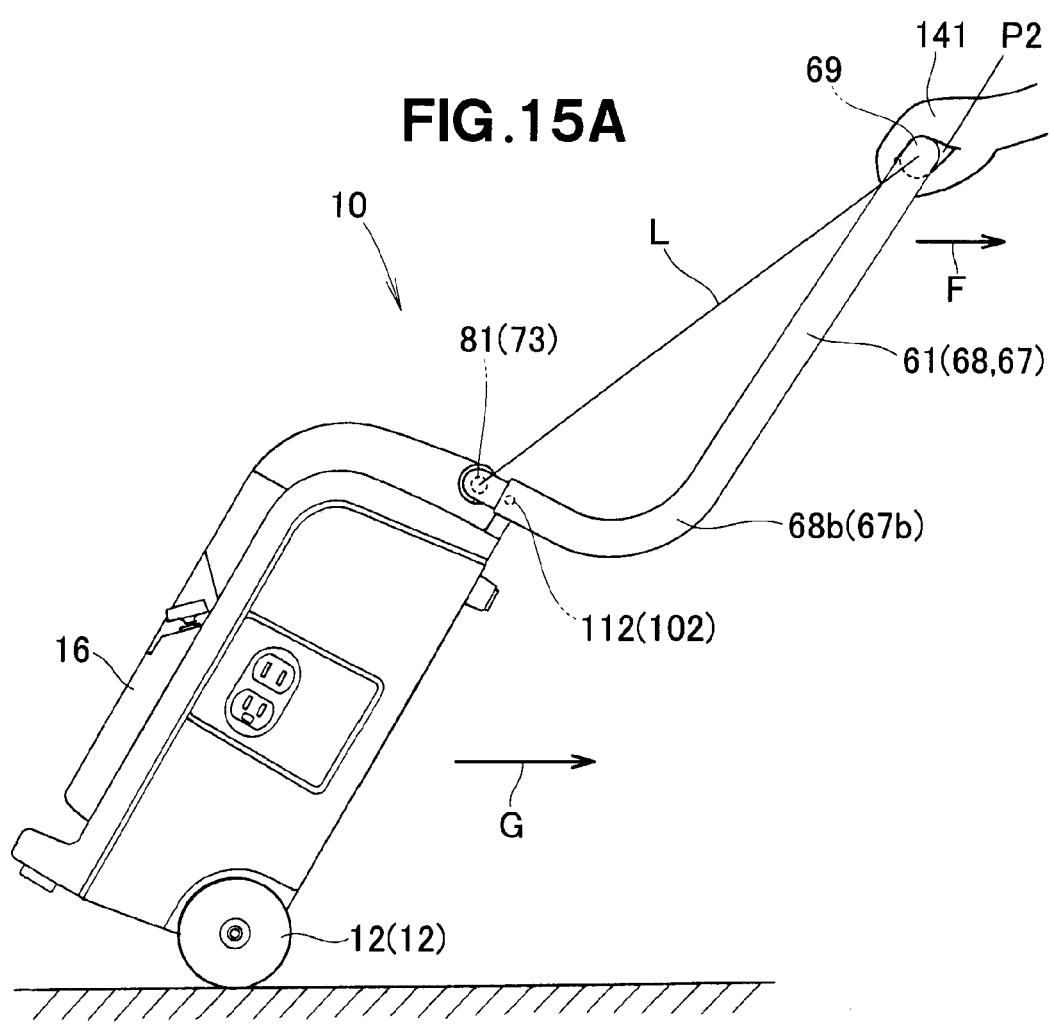
FIGS. 15A and 15B are views illustrating an example manner of towing the working machine with the handle body.

As shown in FIG. 15A, the human operator first positions the handle body 61 in the deployed position P2, then holds the handle grip 69 of the handle body 61 with a hand 141 and then pulls the handle grip 69, as indicated by arrow F. In this way, the working machine body 11 can be towed as indicated by arrow G.

Because the left and right handle sections 67 and 68 of the handle body 61 are each formed in an L shape as viewed in side elevation, there can be secured a greater length L between the left and right support shafts 73 and 81 and the handle grip 69 than in the conventionally-known working machines where the left and right handle sections are each formed in a straight shape. Thus, when the handle body 61 is in the deployed position P2, the handle grip 69 can be positioned at an easy-to-grip position sufficiently remote from the case 16. Therefore, usability or operability of the handle body 61 and hence the working machine can be enhanced.

Figure 15B:
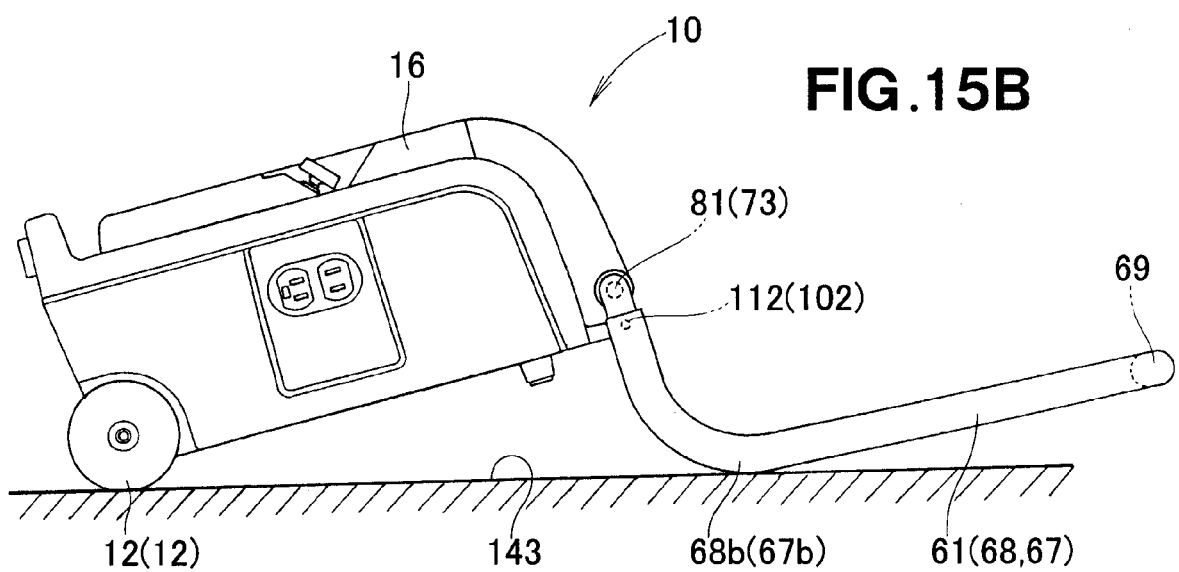

Further, because left and right handle sections 67 and 68 of the handle body 61 are each formed in an L shape as viewed in side elevation as noted above, intermediate corner portions 67b and 68b of the left and right handle sections 67 and 68 project generally in the towing direction beyond the left and right support shafts 73 and 81 when the handle body 61 is retained in the deployed position P2, as shown in FIGS. 15A and 15B.

Thus, if the working machine 10 has toppled down as a result of the human operator accidentally taking the hand 141 off the handle grip 69 during towing of the working machine 10, the corner portions 67b and 68b can abut against a road surface (ground surface) 143. Thus, it is possible to prevent the left and right support shafts 73 and 81 from undesirably abutting against the road surface 143 to be damaged.

Next, with reference to FIGS. 16 and 17, a description will be given about an example manner in which the handle body 61 of the working machine 10 is retracted to the stored position P1.

Figure 16A:
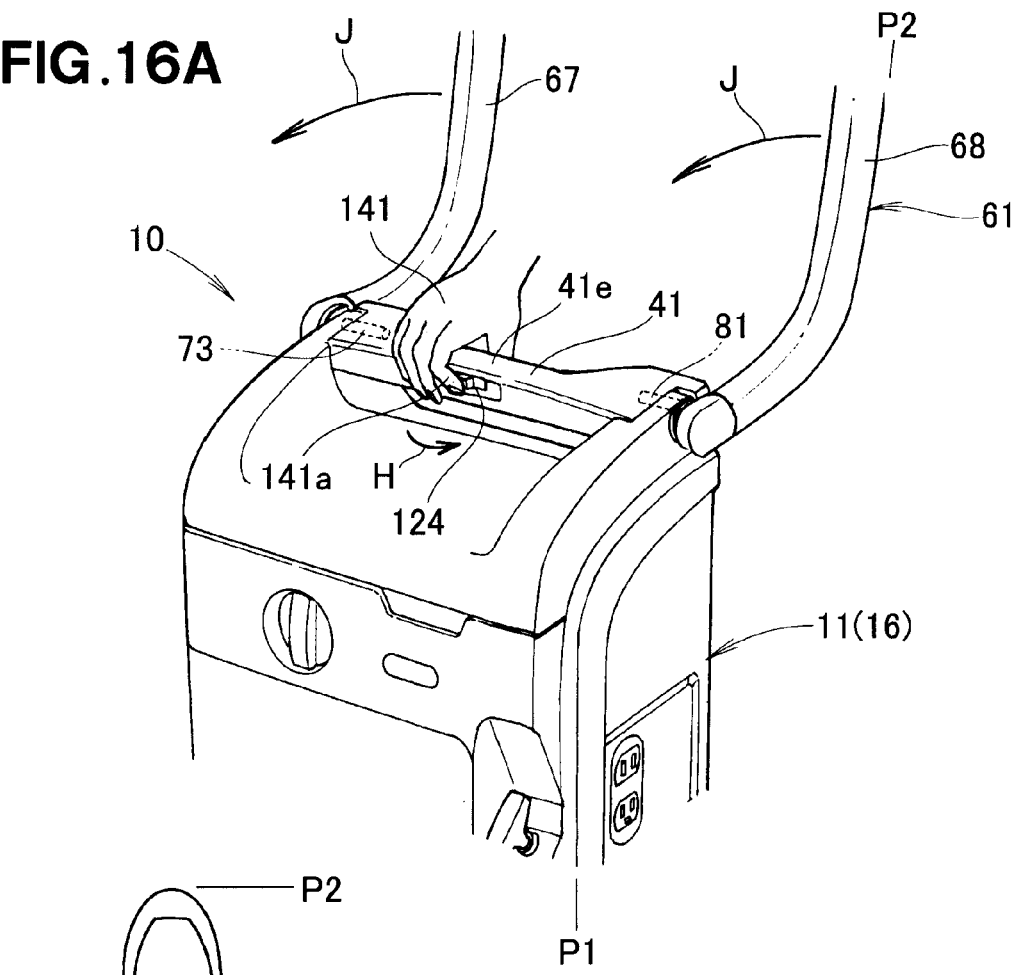
FIGS. 16A and 16B are views illustrating an example manner of cancelling the retained state of the left handle section by an operating knob.

As shown in FIG. 16A, the human operator first holds the middle portion 41e of the grip 41 with the hand 141 and then uses his or her fingers to move the single operating knob 124 from the knob lock position P5 to the knob lock cancellation position P7 (FIG. 16B) as indicated by arrow H. By the human operator holding the machine-carrying grip 41, the working machine body 11 can be held stably, so that the human operator can operate the operating knob 124 with ease.

Figure 16B:
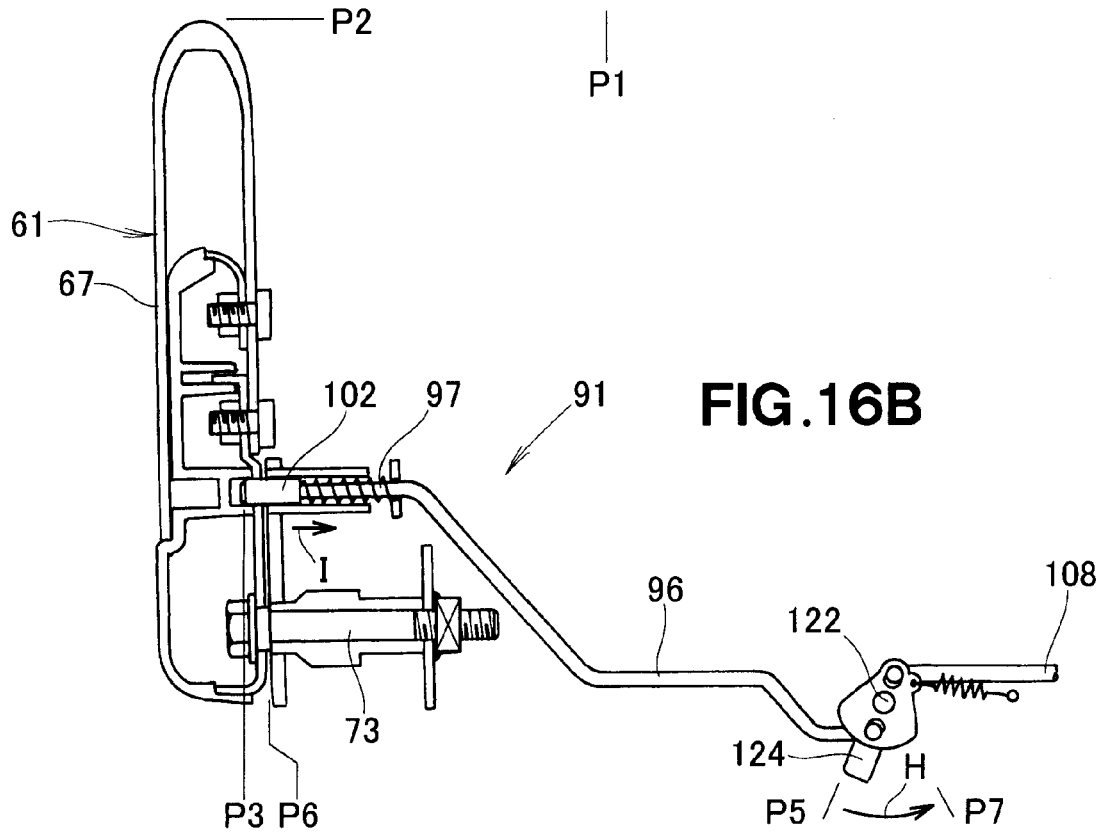
Figure 17:
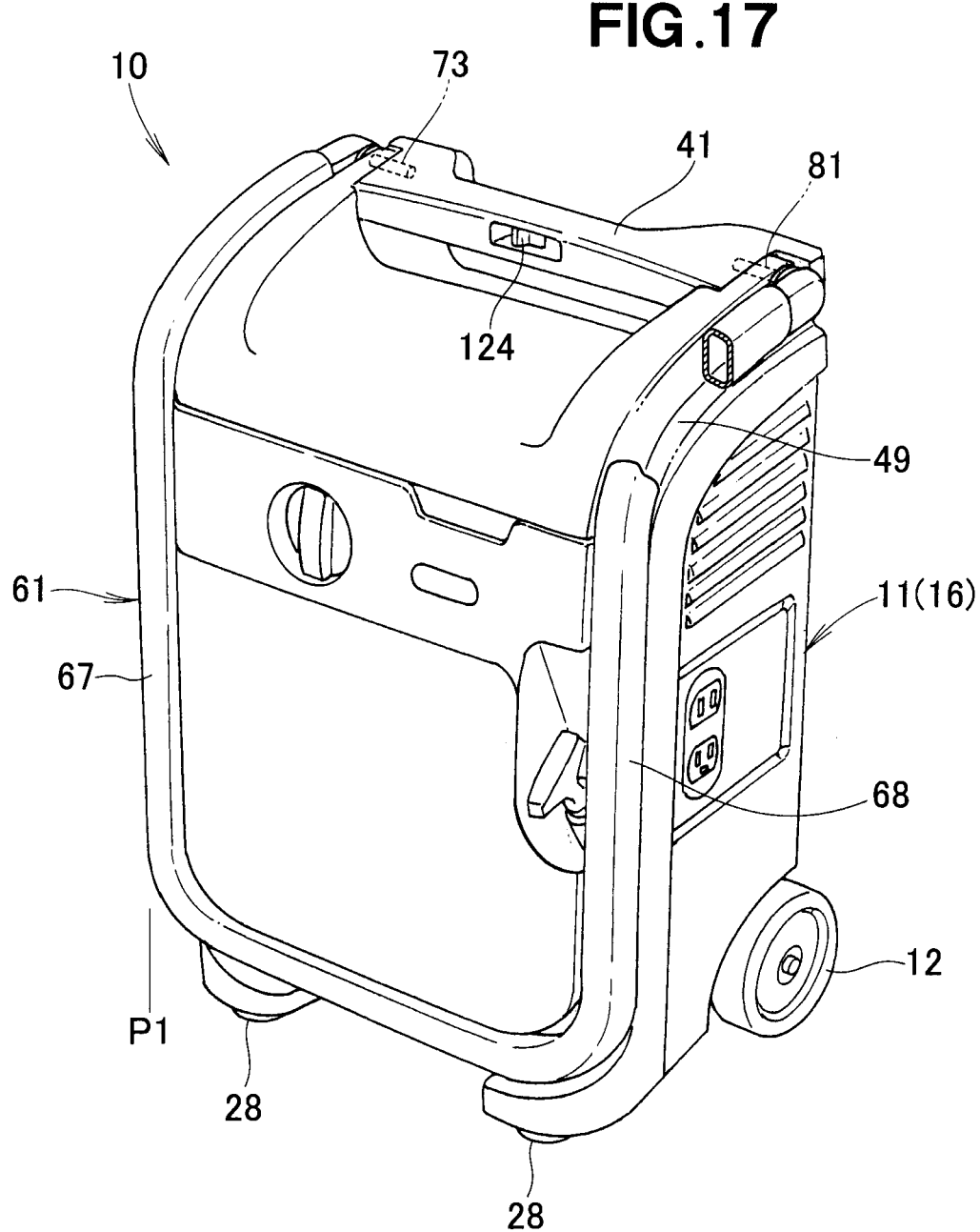
FIG. 17 is a view showing the handle body collapsed to the stored position.

Then, by the human operator moving the operating knob 124 to the knob lock cancellation position P7 as noted above, the left lock pin portion 102 moves from the left lock position P3 to the left lock cancellation position P6 against the biasing force of the left return spring 97 as indicated by arrow I in FIG. 16B, so that the retention, by the left lock section 91, of the left handle section 67 is canceled. At the same time, the retention, by the right lock section 92, of the right handle section 68 is canceled.

Because the retained state of the left and right handle sections 67 and 68 (see FIG. 16A for the right handle section 68) can be canceled through operation of only the single operating knob 124, the retained state of the handle body 61 can be cancelled with ease.

Referring back to FIG. 16A, with the retained or locked state of the handle body 61 cancelled in the aforementioned manner, the human operator pivotally moves the handle body 61 from the deployed position P1 toward the stored position about the left and right support shafts 73 and 81 as indicated by arrow J. Then, the handle body 61 is caused to pivot to the stored position P1 about the left and right support shafts 73 and 81 until it is stored into the storing recessed portion 49.

As described above in relation to FIGS. 16 and 17, the locked state of the handle body 61 can be readily canceled by the human operator merely holding the machine-carrying grip 41 with the hand 141 and operating the single operating knob 124. Further, because the working machine body 11 can be held stably by the human operator holding the machine-carrying grip 41 with the hand 141, the operating knob 124 can be operated with ease. In this way, the handle body 61 can be retracted or collapsed to the stored position P1 with reduced labor by the human operator.

In order to secure sufficient operability of the operating knob 124, it is important to positionally stabilize the working machine 10, especially in the case where the working machine 10 is of a compact portable/towing type having superior portability (more specifically, movability responsive to towing force and transportability achieved by being carried in the vehicle). Thus, the instant embodiment is constructed to allow the human operator to readily operate the operating knob 124 of the working machine 10 of the compact portable/towing type having superior portability by holding the machine-carrying grip 41 with the hand 141 to thereby stably hold the working machine 10. As a result, the handle body 61 of the working machine 10 of the compact portable/towing type can be readily retracted to the stored position P1 with reduced labor by the human operator.

The following describe an example manner in which the working machine 10 is put into the luggage compartment of the vehicle.

As shown in FIG. 18A, the human operator holds the carrying grip 41 with the hand 141 to lift up the working machine 10 as indicated by arrow K and puts the working machine 10 into the luggage compartment 146 of the vehicle 145 (FIG. 18B).

Then, as shown in FIG. 18B, the working machine 10 is inclined about 90 degrees (i.e., turned down), and the left and right carrying foot portions 29 and the left and right wheels 12 are placed into contact with the floor surface of the luggage compartment 146 of the vehicle 145. In this way, the vertically-elongated working machine 10 can be put into and retained in the luggage compartment 146 in a stable condition.

Note that, when the working machine 10 is carried in the vehicle 145, the working machine 10 may undesirably move (positionally shift) from its original vehicle-mounted position due to vibration and acceleration/deceleration occurring during travel of the vehicle.

However, according to the instant embodiment, the to-be-protected members, such as the cassette gas canister 37 (FIG. 18A), operation start/stop switch 31, starter knob 32, exhaust outlet 34 (FIG. 4) and electric outlets 36, are protected with the handle body 61. Thus, even when the working machine 10 has undesirably moved (shifted) from the original vehicle-mounted position, the instant embodiment can reliably prevent the to-be-protected members, such as the cassette gas canister 37, from being interfered with by other vehicle-mounted luggage and/or projecting members of the vehicle 145.

It should be appreciated that the handle structure 13 of the present invention is never limited to the above-described embodiment and may be changed or modified as appropriate without departing from the basic principles of the present invention.

For example, whereas the working machine 10 to which is applied the present invention has been described as being a portable power generator, the present invention is not so limited and may be applied to other types of working machines, such as power spray pumps.

Furthermore, whereas the embodiment has been described above in relation to the case where a gas engine is used as the engine 18, the engine 18 may be another type of engine, such as a gasoline engine. In this case, a fuel tank containing gasoline is used in place of the cassette gas canister 37, and such a fuel tank may be protected as a to- be-protected member.

Furthermore, the working machine body 11, handle lock structure 14, grip 41, left and right grip end portions 41a and 41b, left and right engaging holes 62c and 64a, left and right sections 67 and 68, left and right support shafts 73 and 81, left and right lock members 96 and 108, left and right lock pin portions 102 and 112, lock cancellation lever 114, etc. are not limited to the shapes shown and described above and may be modified in shape as appropriate.

The basic principles of the present invention are suited for application to working machines having a handle movable between a stored position where it is stored in a working machine body and a deployed position extended from the machine body.

What is claimed is:

1. A working machine, comprising:
    a working machine body having a top section and left and right support shafts secured to opposite sides of the top section;
    a towing handle having left and right handle sections pivotally mounted on the left and right support shafts and pivotally movable between a stored position where the handle is stored in the machine body and a deployed position where the handle is deployed from the stored position;
    a machine-carrying grip provided on the top section of the machine body between the left and right support shafts and near and over an imaginary extension line of the left and right support shafts, the machine-carrying grip having a hollow portion extending in a longitudinal direction thereof; and
    a handle lock structure accommodated in the hollow portion of the machine-carrying grip, the handle lock structure including,
        left and right lock members movably received in the hollow portion of the machine-carrying grip for movement into engagement with engaging portions of the left and right handle sections, respectively, as the handle is pivotally moved in a deploying direction from the stored position toward the deployed position, thereby locking the left and right handle sections in the deployed position, and
        a single lock cancellation lever provided in the hollow portion of the machine-carrying grip for moving the left and right lock members out of the engagement with the engaging portions of the left and right handle sections to compulsorily cancel locking, by the left and right lock members, of the left and right handle sections in the deployed position,
    wherein the engaging portions of the left and right handle sections have engaging holes which receive respective one end portions of the left and right lock members when the towing handle is in the deployed position.

2. The working machine of claim 1, wherein the left and right lock members are normally resiliently biased toward the left and right handle sections so as to automatically engage with the engaging portions of the left and right handle sections as the handle is pivotally moved in the deploying direction.

3. The working machine of claim 1, wherein the left and right lock members have respective opposite end portions directly connected to the lock cancellation lever in such a manner that the left and right lock members are movable, together with pivoting movement of the lock cancellation lever, in interlocked relation to each other toward or away from the left and right handle sections.

4. The working machine of claim 3, wherein the left and right lock members are normally biased by means of left and right springs in such a manner that the respective one end portions resiliently engage with the engaging portions of the left and right handle sections as the handle is pivotally moved in the deploying direction.

5. The working machine of claim 4, wherein the single lock cancellation lever includes an operating knob projecting from a body of the lock cancellation lever and operable to move, against biasing force of the left and right springs, the left and right lock members out of the engagement with the engaging holes of the engaging portions of the left and right handle sections and thereby compulsorily cancel the locking, by the left and right lock members, of the left and right handle sections in the deployed position.

6. The working machine of claim 1, wherein the towing handle has a substantially U shape as viewed in a front elevational view, and a substantially L shape as viewed in a side elevational view, and wherein, when the towing handle is in the stored position, it extends along an outer periphery of the working machine body, including left and right side portions of the top section of the working machine body, and along left and right side portions and a bottom portion of the front section of the working machine body.

7. The working machine of claim 6, wherein a storing recessed portion is formed in a case of the working machine body, for accepting the towing handle therein.

* * * * *